(12) United States Patent
Stevenson et al.

(10) Patent No.: US 6,738,388 B1
(45) Date of Patent: *May 18, 2004

(54) SHADOW FUNCTION BLOCK INTERFACE FOR USE IN A PROCESS CONTROL NETWORK

(75) Inventors: Dennis L. Stevenson, Round Rock, TX (US); Vasiliki Tzovla, Austin, TX (US); Larry O. Jundt, Round Rock, TX (US); Dan D. Christensen, Austin, TX (US); Steve L. Dienstbier, Round Rock, TX (US)

(73) Assignee: Fisher-Rosemount Systems, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/151,084

(22) Filed: Sep. 10, 1998

(51) Int. Cl.[7] .................................................. H04J 3/16
(52) U.S. Cl. ...................... 370/465; 370/410; 370/462; 370/463
(58) Field of Search ................................. 370/410, 420, 370/463, 330, 436, 478, 464, 465, 466, 462

(56) References Cited

U.S. PATENT DOCUMENTS

| 5,307,346 A | 4/1994 | Fieldhouse .................. 370/85.1 |
| 5,717,385 A | 2/1998 | Kogure ....................... 340/825 |

(List continued on next page.)

FOREIGN PATENT DOCUMENTS

| EP | 0 299 523 A2 | 1/1989 |
| EP | 0 522 590 A1 | 1/1993 |
| EP | 0 566 283 A2 | 10/1993 |
| EP | 0 895 145 A1 | 2/1999 |
| GB | 2 243 748 A | 11/1991 |
| GB | 2 310 346 A | 8/1997 |
| GB | 2 336 977 A | 8/1998 |
| JP | HEI 06-019922 | 1/1994 |
| JP | HEI 07-036840 | 2/1995 |
| JP | HEI 11-126104 | 5/1999 |
| WO | WO 97/25665 | 7/1997 |
| WO | WO 98/36335 | 8/1998 |

OTHER PUBLICATIONS

Office Action (Notice of Reasons for Rejection) dated Mar. 20, 2003.

(List continued on next page.)

*Primary Examiner*—Alpus H. Hsu
*Assistant Examiner*—Thien Tran
(74) *Attorney, Agent, or Firm*—Marshall, Gerstein & Borun LLP

(57) ABSTRACT

A process controller that is communicatively coupled to an external field device via a communication network uses a shadow function block disposed within a process controller to enable implementation of a control routine that uses both an internal function block disposed within the process controller and an external function block disposed within the external field device. The shadow function block includes a communication port that communicates with the external function block via the communication network to thereby receive data pertaining to the external function block, a memory that stores the received data according to a configuration protocol of the internal function block and an output that provides the stored external function block data to the internal function block according to the configuration protocol of the internal function block. The communication port of the interface function block may include an output that sends data generated by the controller or the internal function block to the external function block using the communication protocol associated with the external function block.

33 Claims, 9 Drawing Sheets

U.S. PATENT DOCUMENTS

| | | | |
|---|---|---|---|
| 5,768,119 A | | 6/1998 | Havekost et al. ............ 364/133 |
| 5,796,602 A | * | 8/1998 | Wellan et al. ............... 364/130 |
| 5,801,942 A | | 9/1998 | Nixon et al. ................. 364/188 |
| 5,828,851 A | | 10/1998 | Nixon et al. ................. 395/285 |
| 5,838,563 A | | 11/1998 | Dove et al. .................. 364/188 |
| 5,962,557 A | | 7/1999 | Edison .................. 364/471.03 |
| 5,995,916 A | * | 11/1999 | Nixon et al. ................. 702/182 |
| 6,047,222 A | * | 4/2000 | Burns et al. ................... 700/79 |
| 6,094,600 A | | 7/2000 | Sharpe, Jr. et al. ........... 700/19 |
| 6,119,047 A | * | 9/2000 | Eryurek et al. ............... 700/28 |

OTHER PUBLICATIONS

Great Britain Search Report Under Section 17, dated Jan. 6, 2000, issued in Great Britain Application No. 9911558.6.

Examination Report under Section 18(3) issued by the United Kingdom Patent Office on Feb. 6, 2003.

Fieldbus Foundation Manual, Communications Technical Specification and User Layer Technical Specification, 1994–1997, including Fieldbus Message Specification FF–870–1.1; Physical Layer Conformance Testing FF–830 FS 1.0; Device Description Language FF–900–1.0; Function Blocks (Part 1) FF–890–1.2; Fieldbus Access Sublayer FF–875–1.1; Function Blocks (Part 2) FF–891–1.2; Data Link Protocol FF–822–1.1; System Management FF–880–1.1; Communication Profile FF–940–1.0; Transducer Blocks (Part 1) FF–902 Rev PS 2.0; Transducer Blocks (Part 2) FF–903–Rev PS 2.0; Data Link Services FF–821–1.0; 31.25 kbit/s Physical Layer Profile FF–816–1.0; Network Management FF–801–1.1; and System Architecture FF–800–1.0.

DeltaV™ System Overview Brochure, Fisher–Rosemount Systems, 32 pages (1998).

DeltaV™ Product Data Sheets, DeltaV Control Network, Workstation Specifications, DeltaV Controller, DeltaV Power Supplies, DeltaV I/O Subsystem, DeltaV Diagnostics, DeltaV Event Chronicle, DeltaV Excel Add–in, DeltaV Real–Time Data Server, 56 pages (1996).

* cited by examiner

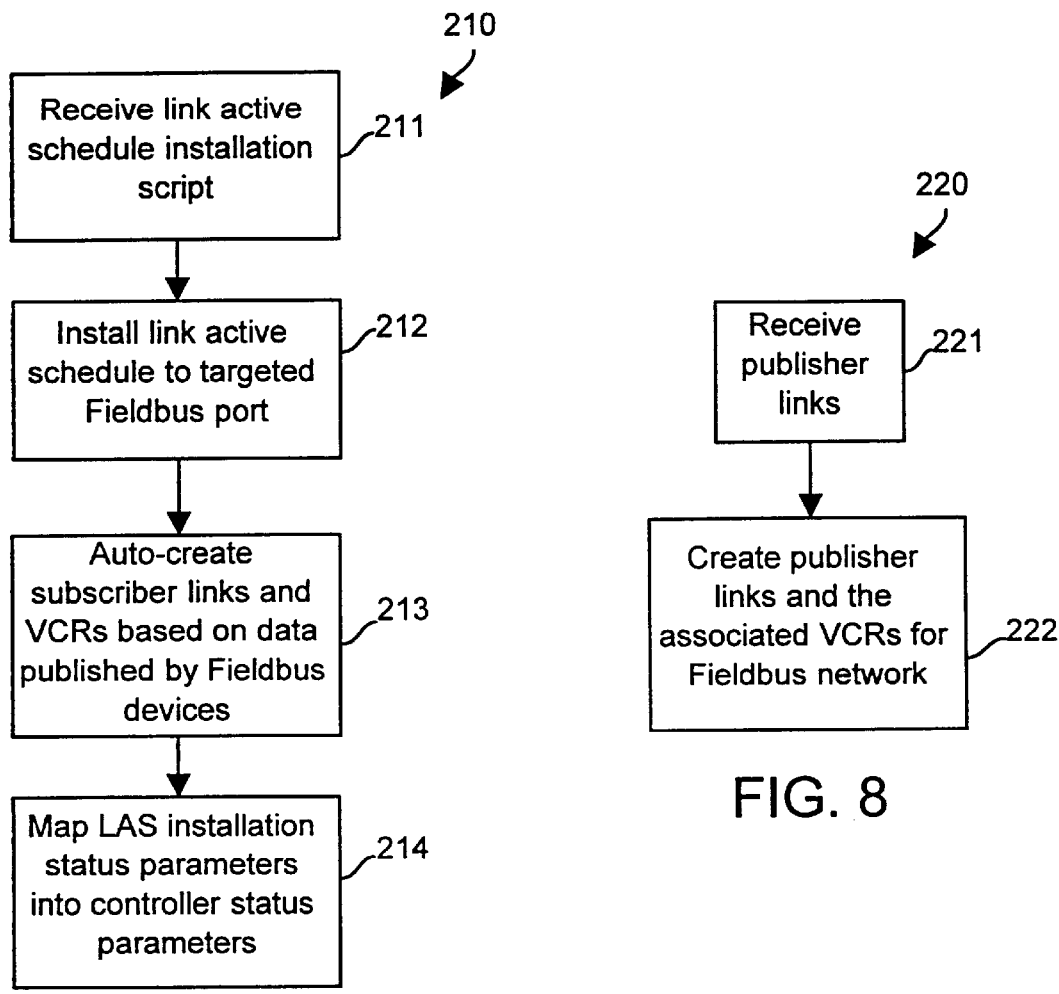

SHADOW FUNCTION BLOCK INTERFACE FOR USE IN A PROCESS CONTROL NETWORK

FIELD OF THE INVENTION

The present invention relates generally to process control networks and, more specifically, to a process controller that uses shadow function blocks to represent information associated with external function blocks distributed throughout a process control network.

DESCRIPTION OF THE RELATED ART

Process control networks, such as those used in chemical, petroleum or other processes, generally include a centralized process controller communicatively coupled to one or more field devices which may be, for example, valve positioners, switches, sensors (such as temperature, pressure and flow rate sensors), etc. These field devices may perform control functions within the process (such as opening or closing a valve), may take measurements within the process for use in controlling the operation of the process or may perform any other desired function within the process. Process controllers have historically been connected to field devices via one or more analog signal lines or buses which may carry, for example, 4–20 mA (milliamp) signals to and from the field devices. Generally speaking, the process controller receives signals indicative of measurements made by one or more field devices and/or other information pertaining to one or more field devices, uses this information to implement a typically complex control routine and then generates control signals which are sent via the analog signal buses to one or more of the field devices to thereby control the operation of the process.

Recently, there has been a move within the process control industry to implement field-based digital communications within the process control environment. For example, the process control industry has developed a number of standard, open, digital or combined digital and analog communication protocols such as the HART®, PROFIBUS®, WORLDFIP®, Device-Net® and CAN protocols. These digital communication protocols generally enable more field devices to be connected to a particular bus, support more and faster communication between the field devices and the controller and/or allow field devices to send more and different types of information, such as information pertaining to the status and configuration of the field device itself, to the process controller. Furthermore, these standard digital protocols enable field devices made by different manufacturers to be used together within the same process control network Also, there is now a move within the process control industry to decentralize process control and, thereby, simplify process controllers. Decentralized control is obtained by having field mounted process control devices, such as valve positioners, transmitters, etc. perform one or more process control functions using what are typically referred to as function blocks and by then communicating data across a bus structure for use by other process control devices (or function blocks) in performing other control functions. To implement these control functions, each process control device typically includes a microprocessor having the capability to implement one or more function blocks as well as the ability to communicate with other process control devices using a standard and open communication protocol. In this manner, field devices can be interconnected within a process control network to communicate with one another and to perform one or more process control functions forming a control loop without the intervention of a centralized process controller. The all-digital, two-wire bus protocol now being promulgated by the Fieldbus Foundation, known as the FOUNDATION™ Fieldbus (hereinafter "Fieldbus") protocol is one open communication protocol that allows devices made by different manufacturers to interoperate and communicate with one another via a standard bus to effect decentralized control within a process.

Because digital communication protocols and decentralized control schemes (such as that used in the Fieldbus control environment) are so new, processes which implement these protocols typically do so only to a limited extent. As a result, newer process controllers, such as the DeltaV™ process controller manufactured by Fisher-Rosemont Systems support both analog and digital communication protocols and hardware and can be programmed to implement control in a process that includes field devices which communicate using standard analog protocols, such as the 4–20 mA protocol, and one or more of the newer digital protocols, such as the Fieldbus protocol.

However, problems have arisen when trying to integrate control of analog and digital field devices, and particularly Fieldbus field devices, in a process control network using a centralized controller. Because the control functions for analog field devices and some digital field devices are implemented within the centralized process controller, all the necessary information about these field devices is received by and stored within the centralized process controller. This in turn enables the centralized process controller to integrate control of the different analog and digital field devices, to display the current configuration and state of the portions of the process control network in which these devices are located, to make changes to the process control network configuration with respect to these devices, etc. However, when a decentralized control scheme, such as the Fieldbus control scheme, is used in a part of the process, the centralized process controller no longer needs or has direct access to all of the current information being used by or associated with the process control devices subject to the decentralized control. In fact, some decentralized process control protocols, such as the Fieldbus protocol, are specifically designed so that it is not necessary to send information to a centralized process controller on a regular basis. This fact makes it difficult for the centralized process controller to integrate the control of the analog or other digital field devices with the field devices subject to decentralized control. Also, it makes it difficult for the centralized process controller to model or display the current state of the devices subject to decentralized control or within a decentralized portion of the process control network.

In fact, for the centralized process controller to receive information from the decentralized control portion of the process control network, the field devices (or function blocks) within that portion of the process must be specifically configured to send information directly to the centralized process controller (which means that the centralized process controller must receive and track all of this information, most of which is not necessary for operation of the centralized process controller). Alternatively, the centralized process controller must actively request to receive the information it needs. Because such a request is not given a high priority in, for example, the Fieldbus protocol, by the time the centralized process controller receives the requested information, this information may be out of date.

Furthermore, it is difficult, if not impossible for the centralized process controller to request and receive data that is active or current at a specified time. Instead, the centralized process controller only receives the data active at the time the request reaches the field device. Still further, communication between the centralized process controller and field devices within the decentralized portion of the process is highly specialized and requires considerable knowledge of the decentralized control protocol, which makes it difficult for the designer of the centralized process control routine to implement this communication on an as needed basis.

SUMMARY OF THE INVENTION

The present invention is directed to the use of shadow function blocks to integrate, in a centralized process controller, the control of function blocks residing in the centralized controller with those residing in an external device, such as a field device. The present invention may also be used to enable a controller to control and communicate with devices or function blocks that are located in a communication network or that use a communication protocol that is different than that used by the controller. In particular, a shadow function block is set up in the centralized controller to mirror the data associated with an external function block located in an external device, such as in a field device conforming to a decentralized control and communication protocol. The control routine of the centralized controller communicates with the external function block via the shadow function block as if the external function block was being implemented by the centralized controller. The shadow function block automatically obtains current information associated with the external function block and sends commands to the external function block using the protocol associated with the external (e.g., decentralized) control protocol. In the case of a Fieldbus protocol, this communication is accomplished using both synchronous and asynchronous communications. However, the shadow function block communicates with other function blocks within the centralized controller as if the external function block is being fully implemented by the centralized controller.

Using the shadow function block of the present invention, the centralized process control routine can receive up-to-date information about the actual function block on a real-time or near real-time basis because this information is mirrored in the shadow function block which is always accessible to the centralized process control routine. Likewise, the centralized process control routine can send commands to the actual function block by sending a command to the shadow function block without regard to the type or location of the device in which the actual function block is located. The shadow function block then immediately relays this command to the actual function block using the appropriate communication commands associated with the decentralized process control protocol. In this manner, the centralized process control routine does not need to perform any significant database control with respect to all of the field devices within the decentralized control portion of the process because the information it needs for field devices within the decentralized portion of the process control network is located in the shadow function block(s). Likewise, the centralized process control routine does not need to be specifically programmed to deal with the complex and demanding tasks of communicating in the decentralized process control protocol because this communication is performed automatically by the shadow function block.

According to one aspect of the present invention, an interface or shadow function block is adapted to be used in a process controller communicatively coupled to an external device via a communication network to enable the process controller to implement a control routine using both an internal function block residing in the process controller and an external function block residing within the external device. The interface or shadow function block according to this aspect of the invention includes a communication port having an input that communicates with the external function block via the communication network to thereby receive data pertaining to the external function block and a memory that stores the received data pertaining to the external function block according to a configuration protocol of the internal function block. If desired, the interface function block may also include an output that provides the stored external function block data to the internal function block using the configuration protocol of the internal function block. Likewise, the communication port of the interface function block may include an output that sends data (such as linked data or commands) to the external function block using a communication protocol associated with the external function block.

Preferably, the communication port of the interface function block receives the data pertaining to the external function block independently of the operation of the internal function blocks. Likewise, in one embodiment, the external function block communicates via the communication network using a first communication protocol that is different than a second communication protocol associated with the internal function block and, in this case, the communication port communicates with the external function block using the first communication protocol and the output of the interface function block communicates with the internal function block according to the second communication protocol.

If desired, the first communication protocol associated with the external function block may be the Fieldbus communication protocol. In this case, the communication port may use an interface device (such as an interface card) configured to communicate with the external device using the Fieldbus communication protocol to thereby communicate with the external function block. The communication port may, for example, communicate with the external function block using synchronous communications, such as the publisher/subscriber relationships of the Fieldbus communication protocol, and/or using asynchronous communications, such as the view objects of the Fieldbus communication protocol. More generally, the external device may communicate using a device communication protocol that supports the communication of logically linked packets of data using standardized communication calls, such as the view objects and view alerts of the Fieldbus communication protocol, and the communication port may communicate with the external function block using the standardized communication calls. Likewise, the communication port may receive alarm indications from the external function block and store these alarm indications in memory for use by the controller.

According to another aspect of the present invention, a controller adapted to be communicatively coupled to a plurality of field devices includes a processor, a memory and a control routine stored in the memory and implemented by the processor to control the plurality of field devices. The control routine includes a multiplicity of interconnected internal function blocks configured using a controller protocol to be implemented by the controller and an interface function block that communicates with one of the interconnected internal function blocks using the controller protocol and that communicates with an external function block residing in an external field device using a field device communication protocol. The interface function block stores data pertaining to the external function block received from the external function block for use by the control routine.

According to a further aspect of the present invention, a method of implementing a control routine within a process controller stores, within the controller, a plurality of interconnected internal function blocks configured according to a controller protocol for implementation as part of the control routine. The method also creates, within the controller, an interface function block that is configured according to the controller protocol but which communicates with an external function block located in an external field device using a device communication protocol associated with the external device. The method then creates a control routine that uses the plurality of interconnected internal function blocks and the interface function block to control the process and, during implementation of the control routine, stores data associated with and received from the external function block in the interface function block for use by the control routine as if the external function block were being implemented by the controller as one of the internal function blocks.

The method may allow a user to configure the control routine by specifying each of a number of function blocks to be used in the control routine, identifying the interconnections between the specified function blocks to be used in the control routine and specifying the location of a particular specified function block as being an internal function block implemented in the controller or an external function block implemented by a field device. In the case in which a function block is to be implemented in an external device, the method includes the step of selecting an external device from a list or set of devices connected within the system.

BRIEF DESCRIPTION OF THE DRAWINGS

FIG. 7 is a flow chart illustrating the installation of a link active schedule in the Fieldbus portion of the process control network of FIG. 1;

FIG. 8 is a flow chart illustrating the installation of publisher links in the Fieldbus portion of the process control network of FIG. 1;

DESCRIPTION OF THE PREFERRED EMBODIMENTS

Figure 1:
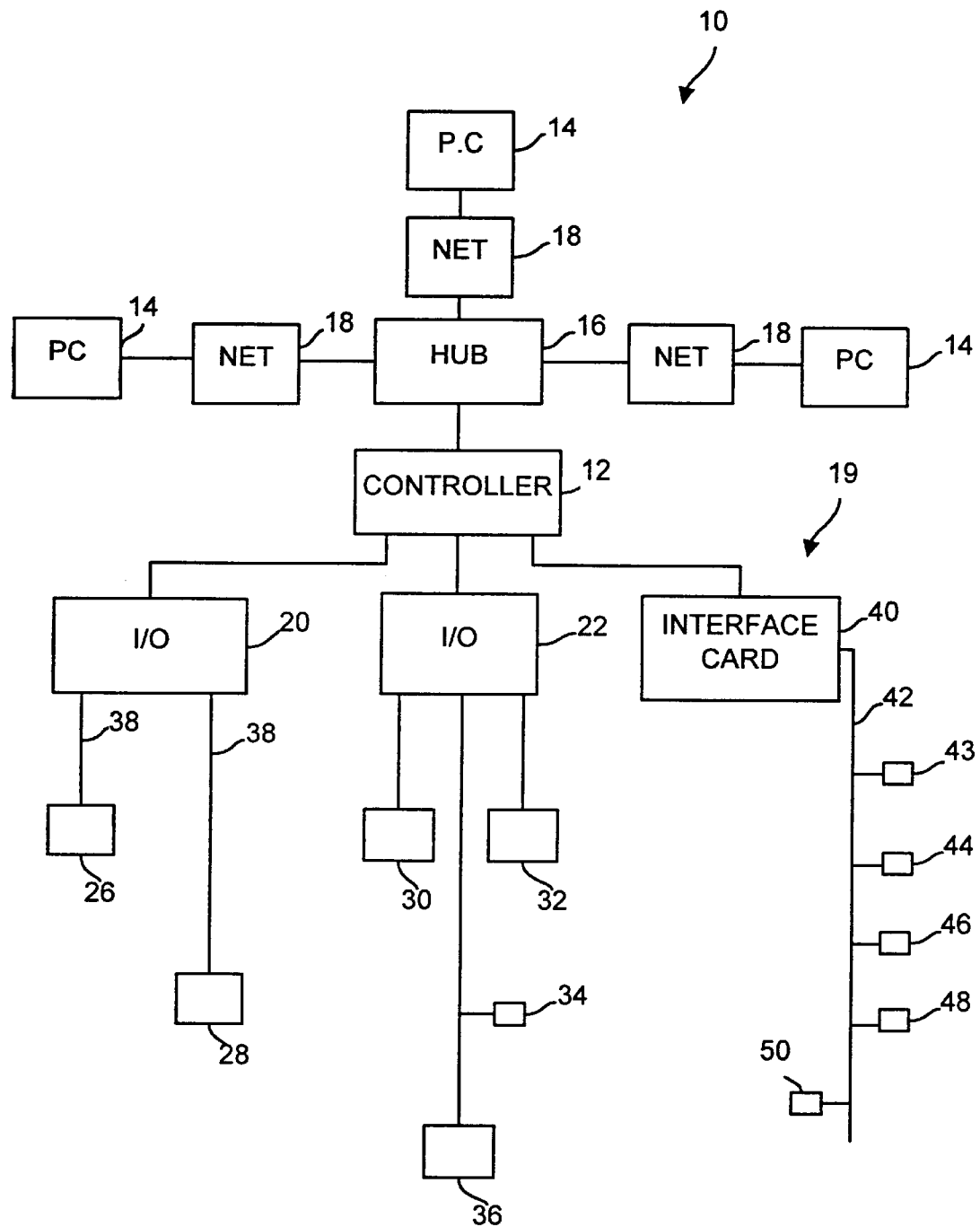
FIG. 1 is a schematic block diagram of an example process control network having centralized and decentralized process control portions therein.

Referring now to FIG. 1, a process control network 10 is illustrated in block diagram form. The process control network 10 includes a centralized process controller 12 capable of implementing a process control routine stored therein. The controller 12 may be, by way of example only, the DeltaV™ controller sold by Fisher-Rosemont Systems and may be connected to numerous workstations such as personal computers (PCs) 14 via a hub 16 and ethernet connections 18. In this configuration, the PCs 14 may be used by one or more operators or users to communicate with the process controller 12 to thereby obtain information pertaining to the process control network 10, to review or change the status of the process control network 10, to obtain information pertaining to individual field devices within the process control network 10, etc. If the controller 12 is a DeltaV controller, it may provide a graphical depiction of the process control routine within the controller 12 to the user via one of the PCs 14 illustrating the function blocks or control blocks within the process control routine and the manner in which these function blocks are linked together to provide control of a process. The user may be able to alter the process control routine within the centralized process controller 12 by manipulating the graphical depiction of the function blocks within the control routine to add or delete function blocks from that control routine and/or to change the way in which the function blocks associated with the control routine are linked, i.e., the way in which they are interconnected.

As illustrated in FIG. 1, the centralized controller 12 is connected to numerous field devices located throughout a process (indicated generally by reference number 19). The centralized controller 12 may communicate through any standard types of I/O cards 20 and 22 to field devices 26, 28, 30, 32, 34 and 36 which are subject to centralized control from the controller 12. The I/O card 20 may be, for example, an analog I/O card that connects the controller 12 to analog field devices 24 and 26 which communicate over 4 to 20 mA buses 38. Likewise, the I/O card 22 may be a digital or combined digital and analog I/O card that communicates with digital or mixed digital and analog field devices in any desired format including, for example, the 4 to 20 mA analog format or any known or standard digital format. Of course, the field devices 26, 28, 30, 32, 34 and 36 may be any desired types of field devices including transmitters, sensors, valve positioners, valve controllers, etc. As will be understood for the example process control network 10 illustrated in FIG. 1, the field devices 26–36 are associated with portions of the process 19 subject to centralized control by the control routine within the controller 12.

The controller 12 is also communicatively connected to an interface card 40 which, in turn, is connected to (or is part of) an external process control network in which process control is performed in a distributed manner or which has devices having function blocks that communicate using a communication protocol that is different than that used within the controller 12. In the embodiment illustrated in FIG. 1, the decentralized process control portion of the process 19 includes the interface card 40, a bus 42 and numerous field devices 43, 44, 46, 48 and 50 connected to the bus 42. The distributed process control network of FIG. 1 may be, for example, a Fieldbus network which uses the Fieldbus communication protocol. As will be discussed in more detail herein, the interface card 40 may be a link active scheduler associated with the Fieldbus communication protocol.

The centralized process control routine located within the controller 12 receives inputs from the field devices 26–36 and potentially 43–50, performs calculations and other activities associated with the control routine and then sends commands to the field devices via the I/O cards 20 and 22 and the interface card 40 to implement any desired control of the process 19. It should be noted, however, that the decentralized process control portion of the process control network 10 (i.e., that associated with the bus 42 in FIG. 1) may implement its own process control routine in a decentralized manner, as will be described herein, in conjunction with the control being performed by the controller 12. Thus, while the controller 12 may interface with and perform some control over the devices 43–50 connected to the bus 42, these devices may also implement control functions or function blocks that are associated with control implemented by the controller 12 but that are, instead, distributed throughout the devices connected to the bus 42.

While, in the preferred embodiment, the decentralized portion of the process control network 10 uses the Fieldbus communication and control protocol, it could use any other known or desired protocol as well, including protocols developed in the future. Furthermore, the shadow function block disclosed herein may be used to enable communication between any two different control or communication protocols and is not limited to use between a centralized control routine and a decentralized control network such as one use the Fieldbus protocol. It could, for example, be used between two different centralized control routines or protocols having control blocks therein. In other words, the shadow function block described herein is not limited to use with function blocks in the Fieldbus protocol or even to a protocol associated with a decentralized control routine, but can be used to enable a controller (or other device) to communicate with any other external device that uses any different type of communication protocol.

Before discussing the details of the shadow function block of the present invention and the manner in which the centralized process controller 12 uses such a shadow function block to implement control in a process control network, a general description of the Fieldbus protocol, field devices configured according to this protocol, and the way in which communication occurs in the section of the process control network 10 that uses the Fieldbus protocol will be provided. It should be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Texs. In particular, the Fieldbus protocol, and the manner of communicating with and storing data in devices using the Fieldbus protocol, is described in detail in the manuals entitled Communications Technical Specification and User Layer Technical Specification from the Fieldbus Foundation.

Generally speaking, the Fieldbus protocol is an all-digital, serial, two-way communication protocol that provides a standardized physical interface to a two-wire loop or bus interconnecting "field" equipment such as sensors, actuators, controllers, valves, etc. located in an instrumentation or process control environment of, for example, a factory or a plant. The Fieldbus protocol provides, in effect, a local area network for field instruments (field devices) within a process, which enables these field devices to perform control functions at locations distributed throughout a process facility and to communicate with one another before and after the performance of these control functions to implement an overall control strategy. Because the Fieldbus protocol enables control functions to be distributed throughout a process control network, it reduces the workload of the centralized process controller for those field devices or areas of the process.

A process control network using the Fieldbus protocol may include a host connected to a number of other devices such as a program logic controllers, other host devices and field devices via a two-wire Fieldbus loop or bus, such as the bus 42 of FIG. 1. The Fieldbus bus may include different sections or segments separated by bridge devices, wherein each section of the bus interconnects a subset of the devices attached to the bus to enable communications between the devices in a manner described hereinafter. Typically, a configurer is located in one of the devices, such as a host, and is responsible for setting up or configuring each of the devices (which are "smart" devices in that they each include a microprocessor capable of performing communication and, in some cases, control functions) as well as recognizing when new field devices are connected to the Fieldbus bus, when field devices are removed from the bus, recognizing data generated by the field devices connected to the bus, and interfacing with one or more user terminals, which may be located in the host or in any other device connected to the host in any manner.

The Fieldbus bus supports or allows two-way, purely digital communication and may also provide a power signal to any or all of the devices connected thereto, such as the field devices. Alternatively, any or all of the Fieldbus devices may have their own power supplies or may be connected to external power supplies via separate wires. The Fieldbus protocol allows many device/wire topologies, including multiple devices being connected to the same pair of wires, point-to-point connections in which each device is connected to a controller or a host via a separate two-wire pair (similar to typical 4–20 mA analog systems), and tree or "spur" connections in which each device is connected to a common point in a two-wire bus which may be, for example, a junction box or a termination area in one of the field devices within a process control network.

Data may be sent over the bus segments at any of a number of different communication baud rates or speeds according to the Fieldbus protocol. For example, the Fieldbus protocol provides a 31.25 Kbit/s communication rate (H1) or a 1.0 Mbit/s and/or a 2.5 Mbit/s (H2) communication rate, which will be typically used for advanced process control, remote input/output, and high speed factory automation applications. Likewise, data may be sent over the Fieldbus bus using voltage mode signaling or current mode signaling. The maximum length of any Fieldbus bus or segment is not strictly limited but is, instead, determined by the communication rate, cable type, wire size, bus power option, etc.

The Fieldbus protocol classifies the devices that can be connected to the bus into three primary categories, namely, basic devices, link master devices, and bridge devices. Basic devices can communicate, that is, send and receive communication signals on or from the bus but are not capable of controlling the order or timing of communication that occurs on the bus. Link master devices are devices that communicate over the bus and are capable of controlling the flow of and the timing of communication signals on the bus. Bridge devices are devices configured to communicate on and to interconnect individual segments or branches of a Fieldbus bus to create larger process control networks. If desired, bridge devices may convert between different data speeds and/or different data signaling formats used on the different segments of the bus, may amplify signals traveling between the segments of the bus, may filter the signals flowing between the different segments of the bus and pass only those signals destined to be received by a device on one of the bus segments to which the bridge is coupled and/or may take other actions necessary to link different segments of the bus. Bridge devices that connect bus segments that operate at different speeds must have link master capabilities at the lower speed segment side of the bridge.

Each of the Fieldbus devices is capable of communicating over the bus and, importantly, is capable of independently performing one or more process control functions using data acquired by the device, from the process, or from a different device via communication signals on the bus. Fieldbus devices are, therefore, capable of directly implementing portions of an overall control strategy which, in the past, were performed by a centralized digital controller. To perform control functions, each Fieldbus device includes one or more standardized "blocks" which are implemented in a microprocessor within the device. In particular, each Fieldbus device includes one resource block, zero or more function blocks, and zero or more transducer blocks. These blocks are referred to as block objects.

A resource block stores and communicates device specific data pertaining to some of the characteristics of a Fieldbus device including, for example, a device type, a device revision indication, and indications of where other device specific information may be obtained within a memory of the device. While different device manufacturers may store different types of data in the resource block of a field device, each field device conforming to the Fieldbus protocol includes a resource block that stores some data.

A function block defines and implements an input function, an output function or a control function associated with the field device and, thus, function blocks are generally referred to as input, output, and control function blocks. However, other categories of function blocks such as hybrid function blocks may exist or may be developed in the future. Each input or output function block produces at least one process control input (such as a process variable from a process measurement device) or process control output (such as a valve position sent to an actuation device) while each control function block uses an algorithm (which may be proprietary in nature) to produce one or more process outputs from one or more process inputs and control inputs. Examples of standard function blocks include analog input (AI), analog output (AO), bias (B), control selector (CS), discrete input (DI), discrete output (DO), manual loader (ML), proportional/derivative (PD), proportional/integral/derivative (PID), ratio (RA), and signal selector (SS) function blocks. However, other types of function blocks exist and new types of function blocks may be defined or created to operate in the Fieldbus environment.

A transducer block couples the inputs and outputs of a function block to local hardware devices, such as sensors and device actuators, to enable function blocks to read the outputs of local sensors and to command local devices to perform one or more functions such as moving a valve member. Transducer blocks typically contain information that is necessary to interpret signals delivered by a local device and to properly control local hardware devices including, for example, information identifying the type of a local device, calibration information associated with a local device, etc. A single transducer block is typically associated with each input or output function block.

Most function blocks are capable of generating alarm or event indications based on predetermined criteria and are capable of operating differently in different modes. Generally speaking, function blocks may operate in an automatic mode, in which, for example, the algorithm of a function block operates automatically; an operator mode in which the input or output of a function block is controlled manually; an out-of-service mode in which the block does not operate; a cascade mode in which the operation of the block is affected from (determined by) the output of a different block; and one or more remote modes in which a remote computer determines the mode of the block. However, other modes of operation exist in the Fieldbus protocol.

Importantly, each block is capable of communicating with other blocks in the same or different field devices over the Fieldbus bus using standard message formats defined by the Fieldbus protocol. As a result, combinations of function blocks (in the same or different devices) may communicate with each other to produce one or more decentralized control loops. Thus, for example, a PID function block in one field device may be connected via the Fieldbus bus to receive an output of an AI function block in a second field device, to deliver data to an AO function block in third field device, and to receive an output of the AO function block as feedback to create a process control loop separate and apart from any centralized controller. In this manner, combinations of function blocks move control functions out of a centralized DCS environment, which allows DCS multifunction controllers to perform supervisory or coordinating functions. Furthermore, function blocks allow the use of a graphical, block-oriented structure for easy configuration of a process and enable the distribution of functions among field devices from different suppliers because these blocks use a consistent communication protocol.

In addition to containing and implementing block objects, each field device includes one or more other objects including link objects, trend objects, alert objects, and view objects. Link objects define the links between the inputs and outputs of blocks (such as function blocks) both internal to the field device and across the Fieldbus bus. Trend objects allow local trending of function block parameters for access by other devices such as a host or a controller. Trend objects retain short-term historical data pertaining to some, for example, function block parameter and report this data to other devices or function blocks via the Fieldbus bus in an asynchronous manner. Alert objects report alarms and events over the Fieldbus bus. These alarms or events may relate to any event that occurs within a device or one of the blocks of a device. View objects are predefined groupings of block parameters used in standard human/machine interfacing and may be sent to other devices using asynchronous communications for viewing from time to time.

Figure 2:
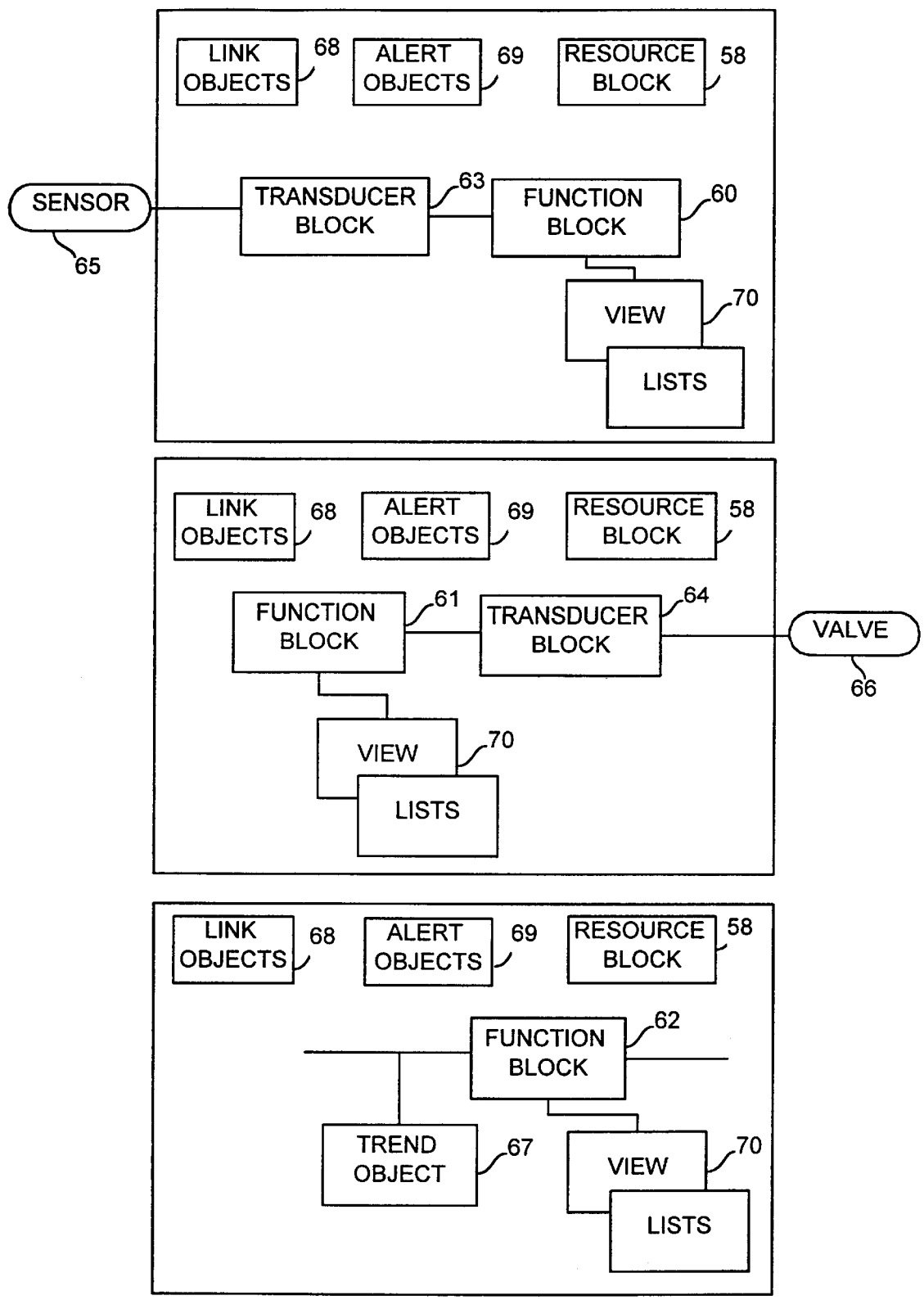
FIG. 2 is a schematic block diagram of three standard function blocks associated with one or more Fieldbus field devices.

Referring now to FIG. 2, three Fieldbus devices, which may be, for example, any of the field devices 43–50 of FIG. 1, are illustrated as including resource blocks 58, function blocks 60, 61 or 62 and transducer blocks 63 and 64. In the first device, the function block 60 (which may be an input function block) is coupled through the transducer block 63 to a sensor 65, which may be, for example, a temperature sensor, a set point indication sensor, etc. In the second device, the function block 61 (which may be an output function block) is coupled through the transducer block 64 to an output device such as a valve 66. In the third device, the function block 62 (which may be a control function block) has a trend object 67 associated therewith for trending the input parameter of the function block 62.

Link objects 68 define the connections of block parameters of each of the associated blocks and alert objects 69 provide alarms or event notifications for the each of the associated blocks. View objects 70 are associated with each of the function blocks 60, 61 and 62 and include or group data lists for the function blocks with which they are associated. These lists contain information necessary for each of a set of different defined views. Of course, the devices of FIG. 2 are merely exemplary and other numbers of and types of block objects, link objects, alert objects, trend objects, and view objects may be provided in any field device.

To implement and perform communication and control activities, the Fieldbus protocol uses three general categories of technology identified as a physical layer, a communication "stack," and a user layer. The user layer includes the control and configuration functions provided in the form of blocks (such as function blocks) and objects within any particular process control device or field device. The user layer is typically designed in a proprietary manner by the device manufacturer but must be capable of receiving and sending messages according to the standard message format defined by the Fieldbus protocol and of being configured by a user in standard manners. The physical layer and the communication stack are necessary to effect communication between different blocks of different field devices in a standardized manner using a two-wire bus and may be modeled by the well-known Open Systems Interconnect (OSI) layered communication model.

The physical layer, which corresponds to OSI layer 1, is embedded in each field device and the bus and operates to convert electromagnetic signals received from the Fieldbus transmission medium (the two-wire Fieldbus bus) into messages capable of being used by the communication stack of the field device. The physical layer may be thought of as the Fieldbus bus and the electromagnetic signals present on the bus at the inputs and outputs of the field devices.

The communication stack, which is present in each Fieldbus device, includes a data link layer, which corresponds to OSI layer 2, a Fieldbus access sublayer, and a Fieldbus message specification layer. The user layer of the Fieldbus protocol is a layer that is not defined in the OSI protocol. Each layer in the communication stack is responsible for encoding or decoding a portion of the message or signal that is transmitted on the Fieldbus bus. As a result, each layer of the communication stack adds or removes certain portions of the Fieldbus signal such as preambles, start delimiters, and end delimiters and, in some cases, decodes the stripped portions of the Fieldbus signal to identify where the rest of the signal or message should be sent or if the signal should be discarded because, for example, it contains a message or data for function blocks that are not within the receiving field device.

The data link layer controls transmission of messages onto the Fieldbus bus and manages access to the bus according to a deterministic centralized bus scheduler called a link active scheduler, to be described in more detail below. The data link layer removes a preamble from the signals on the transmission medium and may use the received preamble to synchronize the internal clock of the field device with the incoming Fieldbus signal. Likewise, the data link layer converts messages on the communication stack into physical Fieldbus signals and encodes these signals with clock information to produce a "synchronous serial" signal having a proper preamble for transmission on the two-wire bus or loop. During the decoding process, the data link layer recognizes special codes within the preamble, such as start delimiters and end delimiters, to identify the beginning and the end of a particular Fieldbus message and may perform a checksum to verify the integrity of the signal or message received from the bus. Likewise, the data link layer transmits Fieldbus signals on the bus by adding start and end delimiters to messages on the communication stack and placing these signals on the transmission medium at the appropriate time.

The Fieldbus message specification layer allows the user layer (i.e., the function blocks, objects, etc. of a field device) to communicate across the bus using a standard set of message formats and describes the communication services, message formats, and protocol behaviors required to build messages to be placed onto the communication stack and to be provided to the user layer. Because the Fieldbus message specification layer supplies standardized communications for the user layer, specific Fieldbus message specification communication services are defined for each type of object described above. For example, the Fieldbus message specification layer includes object dictionary services which allows a user to read an object dictionary of a device. The object dictionary stores object descriptions that describe or identify each of the objects (such as block objects) of a device. The Fieldbus message specification layer also provides variable access services which allows a user to read and change communication relationships, known as virtual communication relationships (VCRs) described hereinafter, associated with one or more objects of a device. Still further, the Fieldbus message specification layer provides context management, variable access services, event services, upload and download services, and program invocation services, all of which are well known in the Fieldbus protocol and, therefore, will not be described in more detail herein. The Fieldbus access sublayer maps the Fieldbus message specification layer into the data link layer.

To allow or enable operation of these layers, each Fieldbus device includes a management information base (MIB), which is a database that stores VCRs, dynamic variables, statistics, timing schedules, function block execution timing schedules and device tag and address information. Of course, the information within the MIB may be accessed or changed at any time using standard Fieldbus messages or commands. Furthermore, a device description is usually provided with each device to give a user or a host an extended view of the information in the VFD. A device description, which must typically be tokenized to be used by a host, stores information needed for the host to understand the meaning of the data in the VFDs of a device.

As will be understood, to implement any control strategy using function blocks distributed throughout a process control network, the execution of the function blocks must be precisely scheduled with respect to the execution of other function blocks in a particular control loop. Likewise, communication between different function blocks must be precisely scheduled on the bus so that the proper data is provided to each function block before that block executes.

The way in which different field devices (and different blocks within field devices) communicate over the Fieldbus transmission medium will now be described. For communication to occur, one of the link master devices on each segment of the Fieldbus loop operates as a link active scheduler (LAS) which actively schedules and controls communication on the associated segment of the bus. The LAS for each segment of the bus stores and executes a communication schedule (a link active schedule) containing the times that each function block of each device is scheduled to start periodic communication activity on the bus and the length of time for which this communication activity is to occur. While there may be one and only one active LAS device on each segment of the bus, other link master devices may serve as backup LASs and become active if, for example, the current LAS fails. Basic devices do not have the capability to become an LAS at any time.

Generally speaking, communication activities over the bus are divided into repeating macrocycles which define the synchronous communication schedule for the bus. A device may be active, i.e., send data to and receive data from any segment of the bus, even if it is physically connected to a different segment of the bus, through coordinated operation of the bridges and the LASs on the bus.

During each macrocycle, each of the function blocks active on a particular segment of the bus executes, usually at a different, but precisely scheduled (synchronous) time. If the function block has an output parameter that is linked to another parameter external to the device, the function block publishes its output data at a precisely scheduled time in response to a compel data command generated by the LAS. Preferably, each function block is scheduled to publish its output data shortly after the end of the execution period of the function block. Furthermore, the data publishing times of the different function blocks are scheduled serially so that no two function blocks on a particular segment of the bus publish data at the same time. During the time that synchronous communication is not occurring, each field device is allowed, in turn, to transmit alarm data, view data, etc. in an asynchronous manner using token driven communications. The execution schedule is stored in the management information base (MIB), the execution times of the blocks are stored in the function blocks and the times for sending the compel data commands to each of the devices on a segment of the bus are stored in the MIB of the LAS device for that segment. These times are typically stored as offset times because they identify the times at which a function block is to execute or send data as an offset from the beginning of an "absolute link schedule start time," which is known by all of the devices connected to the bus.

To effect communications during each macrocycle, the LAS sends a compel data command to each of the devices on associated bus segment according to the list of transmit times stored in the link active schedule. Upon receiving a compel data command, a function block of a device publishes its output data on the bus. Because each of the functions blocks is typically scheduled to execute so that execution of that block is completed shortly before the block is scheduled to receive a compel data command, the data published in response to a compel data command should be the most recent output data of the function block. However, if a function block is executing slowly and has not latched new outputs when it receives the compel data command, the function block publishes the output data generated during the last run of the function block.

During periods in which compel data publications are not scheduled, the LAS may cause asynchronous communication activities to occur. To effect asynchronous communication, the LAS sends a pass token message to a particular field device. When a field device receives a pass token message, that field device has full access to the bus (or a segment thereof) and can send asynchronous messages, such as alarm messages, trend data, operator set point changes, etc. until the messages are complete or until a maximum allotted "token hold time" has expired. Thereafter the field device releases the bus (or any particular segment thereof) and the LAS sends a pass token message to another device. This process repeats until the LAS is either scheduled to send a compel data command to effect synchronous communication or the LAS has network maintenance to perform. Of course, depending on the amount of message traffic and the number of devices and blocks coupled to any particular segment of the bus, not every device may receive a pass token message during each macrocycle.

Figure 3:
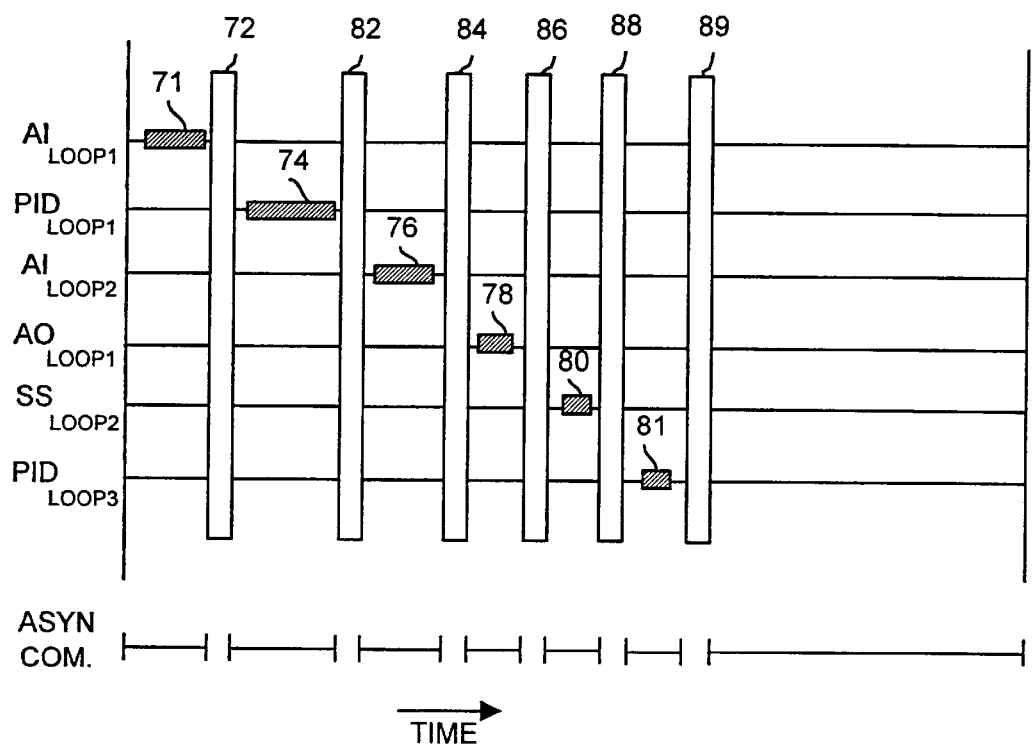
FIG. 3 is a timing schematic for a macrocycle of a segment of a Fieldbus bus located within the process control network of FIG. 1.

FIG. 3 illustrates a timing schematic depicting the times at which function blocks (labeled $AI_{LOOP1}$, $PID_{LOOP1}$, $AI_{LOOP2}$, $AO_{LOOP1}$, $SS_{LOOP2}$, and $PID_{LOOP3}$) execute during each macrocycle of a bus segment and the times at which synchronous communications occur during each macrocycle associated with the bus segment. In the timing schedule of FIG. 3, time is indicated on the horizontal axis and activities associated with the different function blocks are illustrated on the vertical axis. The control loop (which is arbitrary for the purposes of this discussion) in which each of the functions blocks operates is identified in FIG. 3 as a subscript designation. Thus $AI_{LOOP1}$ refers to the AI function block of, for example, a transmitter operating within a first control loop, $PID_{LOOP1}$ refers to the PID function block in, for example, a positioner/valve operating within the first control loop, etc. The block execution period of each of the illustrated function blocks is depicted by a cross-hatched box while each scheduled synchronous communication is identified by a vertical bar in FIG. 3.

Thus, according to the timing schedule of FIG. 3, during any particular macrocycle of the bus segment, the $AI_{LOOP1}$ function block executes first for the time period specified by the box 71. Then, during the time period indicated by the vertical bar 72, the output of the $AI_{LOOP1}$ function block is published on the bus segment in response to a compel data command from the LAS for the bus segment. Likewise, the boxes 74, 76, 78, 80, and 81 indicate the execution times of the function blocks $PID_{LOOP1}$, $AI_{LOOP2}$, $AO_{LOOP1}$, $SS_{LOOP2}$, and $PID_{LOOP3}$, respectively (which are different for each of the different blocks), while the vertical bars 82, 84, 86, 88 and 89 indicate the times that the function blocks $PID_{LOOP1}$, $AI_{LOOP2}$, $AO_{LOOP1}$, $SS_{LOOP2}$ and $PID_{LOOP3}$, respectively, publish data on the bus segment.

As will be apparent, the timing schematic of FIG. 3 also illustrates the times available for asynchronous communication activities, which may occur during the execution times of any of the function blocks and during the time at the end of the macrocycle during which no function blocks are executing and when no synchronous communication is taking place on the bus segment. Of course, if desired, different function blocks can be intentionally scheduled to execute at the same time and not all function blocks must publish data on the bus if, for example, no other device subscribes to the data produced by a function block.

Field devices are able to publish or transmit data and messages over the Fieldbus bus using one of three virtual communication relationships (VCRs) defined in the Fieldbus access sublayer of the stack of each field device. A client/server VCR is used for queued, unscheduled, user initiated, one to one, communications between devices on the bus. Such queued messages are sent and received in the order submitted for transmission, according to their priority, without overwriting previous messages. Thus, a field device may use a client/server VCR when it receives a pass token message from an LAS to send a request message to another device on the Fieldbus bus. The requester is called the "client" and the device that receives the request is called the "server." The server sends a response when it receives a pass token message from the LAS. The client/server VCR is used, for example, to effect operator initiated requests such as set point changes, tuning parameter access and changes, alarm acknowledgments, and device uploads and downloads.

A report distribution VCR is used for queued, unscheduled, user initiated, one to many communications. For example, when a field device with an event or a trend report receives a pass token from an LAS, that field device sends its message to a "group address" defined in the Fieldbus access sublayer of the communication stack of that device. Devices that are configured to listen on that VCR will receive the report. The report distribution VCR type is typically used by Fieldbus devices to send alarm notifications to operator consoles.

A publisher/subscriber VCR type is used for buffered, one to many communications. Buffered communications are ones that store and send only the latest version of the data and, thus, new data completely overwrites previous data. Function block outputs, for example, comprise buffered data. A "publisher" field device publishes or broadcasts a message using the publisher/subscriber VCR type to all of the "subscriber" field devices on the Fieldbus bus when the publisher device receives a compel data message from the LAS or from a subscriber device. The publisher/subscriber relationships are predetermined and are defined and stored within the Fieldbus access sublayer of the communication stack of each field device.

To assure proper communication activities over the Fieldbus bus, each LAS periodically sends a time distribution message to all of the field devices connected to a segment of the bus, which enables the receiving devices to adjust their local datalink time to be in synchronization with one another. Between these synchronization messages, clock time is independently maintained in each device based on its own internal clock. Clock synchronization allows the field devices to synchronize function block execution with the network.

As will be understood from the discussion of the Fieldbus communication protocol given above, communicating with any particular device or function block located in the Fieldbus section of the process control network 10, i.e., connected to the bus 42, requires a detailed knowledge of how communication is generally effected within the Fieldbus protocol as well as a consideration of and knowledge of the how the Fieldbus bus 42 is particularly set up and when communications associated therewith are scheduled and allowed. This, in turn, makes it difficult for a designer of the process control routine implemented within the controller 12 to implement and schedule communications with the devices within the Fieldbus section of the process control network, i.e., the devices connected to the bus 42. Furthermore, because standard or regular communications between function blocks occur in a synchronous manner over the bus 42, the controller 12 must be configured to receive all of these communications or at least the ones it needs to perform its control routine. It can be a daunting task on the part of the controller 12 to coordinate receipt and storage of all of the information flowing on the bus 42 in a way that can be efficiently used by the controller 12 to effect control of the entire process 19. Furthermore, to receive information that is not sent synchronously over the bus 42, the controller 12 must send a request for that information which, as explained above, is sent asynchronously over the bus 42. Because there is no way for the controller 12 to determine or effect when the asynchronous request will be delivered to the appropriate device (because the timing of this request is directly effected by the other asynchronous communications occurring on the bus 42), the controller 12 may receive information that is out-of-date by the time it reaches the controller 12. Likewise, the controller 12 has no way of determining what such data is or was at a specific time, which may be important in controlling other devices within the process 19 not connected to the bus 42. Still further, it may be difficult or impossible for the controller 12 to receive important information pertaining to the status of a device or a function block within the Fieldbus section of the process 19, such as alarms generated by those function blocks.

To overcome these problems, the controller 12 may be designed to use shadow function blocks to implement communication with the devices and function blocks within the Fieldbus section of the process control network 10. More particularly, the control routine within the controller 12 may communicate directly with a shadow function block within the controller 12 which then automatically communicates with an associated actual external function block within a field device connected to the bus 42. The shadow function block within the controller 12 is configured to mirror the state of and the data associated with the actual external function block down within a device connected to the bus 42 so that it appears, to the process control routine within the controller 12, that the actual external function block is accessible without having to communicate through the Fieldbus protocol over the bus 42. In other words, it appears to the process control routine within the controller 12 that the actual function block is located within the process controller 12 instead of down within an external field device connected to the bus 42 and the process control routine uses the shadow function block as it uses other function blocks within the controller 12.

Figure 4:
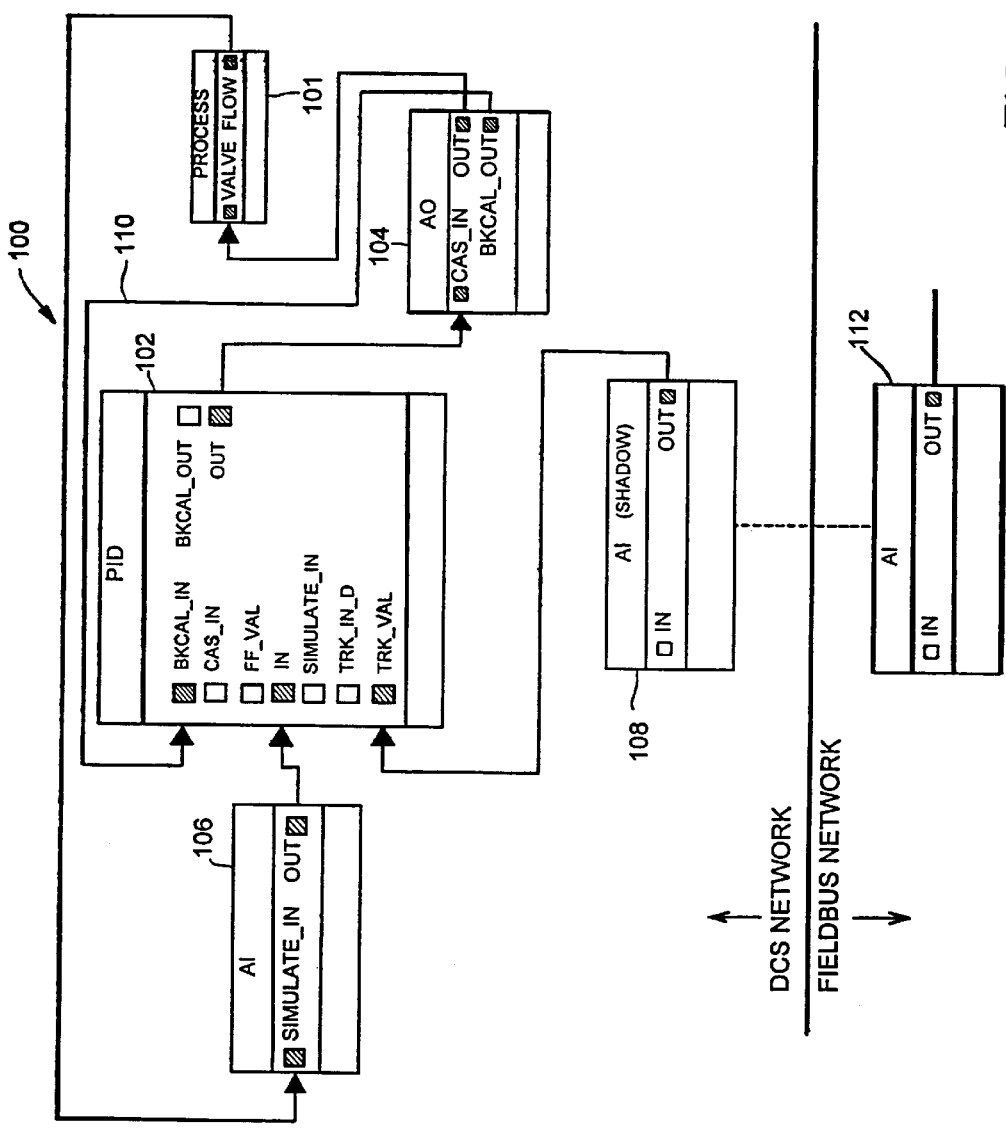
FIG. 4 is a schematic block diagram depicting the interconnection of a shadow function block with other blocks associated with a centralized process control routine located within a centralized process controller.

FIG. 4 illustrates a graphical depiction of a process control loop or module 100 associated with and implemented by the process control routine stored within the process controller 12. To implement control of the entire process 19, the process control routine within the controller 12 may implement many such loops or modules which may be interconnected in any desired manner. The depicted process control loop 100 includes a representation of an aspect (flow) of the process 101 being controlled by number of controller blocks or units and, in particular, by a PID block 102 coupled to an AO block 104, a first AI block 106 and a second AI block 108. Each of the blocks 102, 104 and 106 is a graphical depiction of a control sub-routine (or object within an object oriented programming environment) associated with the process control routine stored within the controller 12, configured according to a controller protocol associated with the controller 12 and used to implement a portion of an overall control strategy with respect to the process 101. Each of the blocks of the process control routine 100 includes inputs and outputs (illustrated by entries on the left and right sides of the blocks respectively) and may include a control algorithm which performs some control function. Interconnections or links between the function blocks are illustrated as lines running from an output of one block to an input of another block. These links represent the manner in which communication is implemented between the individual blocks within the control routine or module to perform a process control loop according to a controller protocol. Thus, the depiction of FIG. 4 illustrates not only the elements of the control loop being performed but also the manner in which the process control routine within the controller 12 is designed to implement this loop. The process control routine can be changed or reconfigured automatically by moving the links between blocks, adding or deleting blocks therefrom, etc. as is performed by the DeltaV process controller.

The PID function block 102 illustrated in FIG. 4 includes an algorithm (implemented by the controller 12) which performs, for example, a proportional/integral/derivative control calculation based on the inputs it receives from the AI blocks 106 and 108 and the AO block 104 and provides an output control signal to the AO block 104 which, in turn, causes a device (such as a valve) within the process 101 to perform a function, like causing a valve to move to increase fluid flow. The AO block 104 may be associated with and control an actual valve, e.g., the valve 28 of FIG. 1, via the I/O device 20 and the 4–20 mA communication line 38. The AO block 104 receives a measurement of the actual position of the valve and provides this measurement as feedback to the PID function block 102 via the link 110. Still further, the PID function block 102 receives inputs from the AI block 106, which is associated with, for example, a sensor such as a temperature sensor located within the process 19. This sensor may be, for example, the sensor 34 of FIG. 1, in which case the AI block 106 receives sensor measurements via the I/O device 22 using standard communications. Such a connection is illustrated in FIG. 4 by the link between the output marked "flow" in the process 101 and the input to the AI block 106 marked "simulate_in". The processing and control of the information associated with the PID function block 102, the AO block 104 and the AI block 106 is performed within the controller 12.

Generally speaking, within the DeltaV control system, i.e., using the DeltaV controller configuration protocol, each of the blocks 102, 104 and 106 is specifically configured to support all of the information and data associated with similar function blocks in the Fieldbus protocol and thus, for all intents and purposes, is very similar to a function block within the Fieldbus protocol except that the control functions are performed by the central processor 12 and information is received from and delivered to particular field devices via standard communication lines from the process controller 12. Thus, the portions of the control routine depicted in FIG. 4 including the blocks 102, 104 and 106 are currently provided in the DeltaV environment and are known.

To support Fieldbus integration within the controller 12, the following approach may be taken using a Delta-V control system (or other centralized control system) in which the base set of function blocks used in the control system is similar to those defined by the Fieldbus protocol. The external Fieldbus or manufacturer specific function blocks are individually assigned to execute in conjunction with the control system (or as part of the control system) and the function blocks in the Fieldbus devices are reflected in control system as shadow function blocks that support internal and external references as though the external function blocks reside in the control system. The control system automatically updates the dynamic and static parameters of the shadow function block and passes change requests to the appropriate external function blocks using the shadow function blocks. Alarms detected in the external devices (or function blocks) are reflected in the shadow function blocks and are incorporated into the alarm processing of the control system. Of course, the shadow function block communicates with the external function blocks using the communication protocol associated with the external function blocks which may be, and typically is, different than the controller configuration protocol used by the controller to implement communications between the function blocks internal to the controller. Also, links between internal and external function blocks may be defined by the user in a manner which is independent of where the function block resides. As a result, during control definition and on-line diagnostics, function blocks appear the same whether they are internal (and reside in the control system) or are external (and reside in a Fieldbus device).

Thus, according to the present invention, the AI block 108, which is depicted in FIG. 4 as being similar to the AI block 106, is actually a shadow function block that is configured to communicate with an external function block 112 located within, for example, the sensor 48 connected to the Fieldbus 42 of FIG. 1. The shadow function block 108 provides measured or other signals associated with the external function block 112 to the PID block 102 via links established therebetween. To indicate that the block 108 is a shadow function block associated with an external function block 112 and communicates therewith using the communication protocol of the external function block 112, the block 108 is depicted as having a dotted line connected to the AI function block 112 within the Fieldbus device 48. However, the shadow function block 108 may be depicted as having the device tag and/or block name at the bottom thereof, or may be depicted in any other desired manner, it being understood that the manner in which the shadow function block is depicted to a user is not critical to the operation of the shadow function block. Furthermore, the inputs and outputs associated with the AI function block 112 are delivered within the Fieldbus network according to the way in which that network has been configured.

While the shadow function block 108 accesses and mirrors all or most of the information associated with and/or generated by the actual function block 112, any processing that takes place with respect to the AI function block 112 (or any other function block for which a shadow function block exists) does so down in the external device, not in the shadow function block 108 or even in the controller 12. As a result, the shadow function block 108 can be thought of as a conduit of information between the PID block 102 (or any other block within the centralized controller 12) and the actual function block 112. The shadow function block 108 is not a function block that is fully operational by the controller 12 in the sense that the AI block 106 and PID block 102 are operational by the controller 12 because the shadow function block 108 merely mirrors the information within the actual external function block 112 or otherwise provides communication between the controller 12 and the actual external function block 112. None-the-less, by proper operation of the shadow function block, the controller 12 can control and communicate with the actual function block 112 as if it were being fully implemented within the controller 12. For example, by communicating with the shadow function block 108 using the controller configuration protocol, the process control routine within the controller 12 can receive up-to-date information from the function block 112 and can send commands to the function block 112 as quickly as possible without the worrying about where the actual function block 112 is located or how to effect communications with the actual function block 112. Instead, the communications between the actual function block 112 and the shadow function block 108 occur automatically without intervention by the process control routine, which needs only to take the steps it typically takes to implement communications between control or function blocks located within the controller 12. In this manner, the shadow function block enables a controller, which is implementing function blocks within the controller, to utilize and incorporate function blocks that use different communication or configuration protocols and that are not within the controller but that are, instead, located in and implemented by an external device, such as a microprocessor based field device located within a process environment. This added capability is accomplished transparently to the controller 12 so that, once the shadow function block is set up in the controller 12, the control routine does not need to track where the actual function block is located or perform complex communications or database manipulations in order to utilize the external function block 112.

As will be understood, the shadow function block 108 stores the inputs and outputs and the parametric updates associated with the AI function block 112 in a database in the controller 12 in any desired format but, preferably stores these in the same or similar format as the information associated with the control blocks implemented by the controller, i.e., using the controller configuration protocol. This makes communication with the shadow function block 108 transparent to the controller 12, i.e., the process control routine 100 provides communication with respect to the shadow function block 108 (and thus the actual function block 112) via links in the same manner that it provides communication with respect to the other function blocks 104 and 106. While it is desirable to have the function blocks within the controller 12 logically configured to support all (or most) of the information supported by the decentralized (or external) process control network (as is the case with the DeltaV controller and the Fieldbus communication protocol), this configuration is not necessary. In fact, any controller setup can be supported using the shadow function block disclosed herein by mapping the data supported in and available from the external function block to the data used by and available in the controller routine.

Generally speaking, to effect operation of the shadow function block 108 in a Fieldbus network, the actual function block 112 is configured to send or publish linked data (i.e., data that is linked to another block within the controller 12 via one of the links illustrated in FIG. 4) to the process controller 12 via the interface card 40 using the publisher/subscriber VCR (i.e., synchronous communications) in the Fieldbus communication protocol. Other non-linked data associated with the actual function block 112 is delivered to the interface card 40 using asynchronous communications, using, for example, the view object or alert object functions within the Fieldbus protocol which occurs at the module scan rate of the control module within the controller 12. Typically, therefore, linked data is sent to the controller 12 from the function block 112 at a much faster rate than other (less time sensitive) data. Conversely, linked data sent by a block within the controller 12 to the shadow function block 108 is immediately forwarded to the interface device 40 where it is then published on the Fieldbus bus 42 using standard synchronous communications.

The information sent by the actual function block 112 is automatically placed in the shadow function block 108 and is thus available to the control routine in the controller 12 at any time. To effect this operation, the interface card 40 (which may be part of a communication port of the shadow function block) subscribes to the published link parameter data produced by the function block 112 and forwards this information to the process controller 12 at the rate defined by the execution rate of the function block within macrocycle of the Fieldbus segment to which the external function block 112 is connected. Likewise, the interface card 40 (which is typically the LAS of the Fieldbus segment) obtains view objects and/or alert objects of the actual function block at the rate defined by the scan rate of the controller module in which the shadow function block 108 resides, i.e., at the rate that the control routine 100 in the controller 12 implements the blocks associated therewith. As is known, the Fieldbus protocol includes four types of view objects which store the normally dynamic (view object 1), normally static (view object 2), all dynamic (view object 3) and all static (view object 4) variables. The interface card 40 is configured to receive automatically on a periodic basis or by sending out a request for such information, the all dynamic view object 3, which includes the values for all of the dynamic variables associated with the actual function block 112. Upon receiving this view object information, the interface card 40 stores the information in a database accessible by the shadow function block, and the shadow function block 108 updates the variables which have changed thereby making these variable values available to the process control routine within the controller 12. If one of the dynamic variables (the static revision variable) indicates a change to a static variable, the shadow function block or software within the interface card 40 may request that the view object 4 (all static variables) be sent to the shadow function block 108 to update the static variables. In the preferred embodiment, the H1 interface card 40 continually receives view object 3 at the module scan rate of the control module 100 within the controller 12.

As noted above, the controller 12 (or any function block thereof) can send commands to the actual function block 112 within the Fieldbus network via the shadow function block 108 by merely changing a parameter within the shadow function block 108. This parameter change is automatically sent down to the AI function block 112 via an output of the shadow function block 108 where it is used to change the configuration of the AI function block 112. While the data change or write command is not made in the actual function block 112 at the exact same time that it is received by the shadow function block 108, from the standpoint of the controller 12, this change occurs very quickly and is reflected back up in the shadow function block 108 when the change has actually been made. This operation allows the controller 12 and, specifically, the PID function block 102 within the controller 12 to effect a change by merely writing that change into a memory location associated with the shadow function block 108 and having the communication done automatically thereafter without having to perform any specialized communication activities necessary for getting data into and out of the Fieldbus network.

Besides input and output parametric data, other types of data such as mode and status data may be communicated between a controller function block (i.e., an internal function block) and the shadow function block 108 as well as between the shadow function block 108 and the actual external function block 112. Of course, this information is sent with the view object or alert object information from the external function block 112 to the shadow function block 108. Likewise, such mode and status data may be delivered to the shadow function block 108 from an internal function block within the controller 12 and that data may then be forwarded to the external function block 112 for use. The status parameter of a function block typically indicates the quality of the measurement or data being provided by the function block and may provide reasons why a poor quality exists. It may also indicate a limit, such as a high or low limit for which the data may take. Typically, the mode parameter indicates what mode the function block is in, which may be, for example, a manual mode, an automatic mode or a cascade mode as defined by the Fieldbus protocol.

Still further, alarm detection based on alarms generated in the actual external function block is provided because events and reports are automatically generated by the external function block as dynamic parameters which are then provided through the view or alert objects to the shadow function block 108. As a result, alarm information pertaining to the external function block may be viewed by and used by the controller 12.

Of course, while the block 108 has been described herein as a shadow function block, any of the blocks within FIG. 4 could also or alternatively be shadow function blocks.

The advantages associated with using a shadow function block such as the shadow function block 108 illustrated in FIG. 4 is that it allows the process control designer to be implement control within a centralized process controller 12 using external function blocks, i.e., function blocks actually implemented within a different device and subject to different communication protocols. With the shadow function block, the designer does not need to worry that the external function block is associated with a different communication or control protocol or is located in a different device because the communication between the shadow function block and the external function block occurs automatically and transparently to the control routine. Furthermore, once a shadow function block is implemented and running, it is easy to model what is happening within the entire process control system without needing to worry about whether actions are occurring within a Fieldbus or other external device or within the controller because the shadow function block makes it appear to the controller and to the user that the actual function block is being implemented in the controller, even though this is not really the case.

When using a common function block set and shadow function blocks in the control system to reflect function blocks assigned to external devices, the control strategy may be initially designed without knowing whether a particular function block of that strategy will reside in the control system or in an external device and user applications may access shadow function blocks (which reflect or model the external function blocks) in exactly the same manner as they access control system function blocks. Also, alarms detected by the external device are fully integrated into the control system alarm processing through the shadow block, allowing these alarms to appear in exactly the same manner for external function blocks as for function blocks that reside in the control system.

Figures 5, 6:
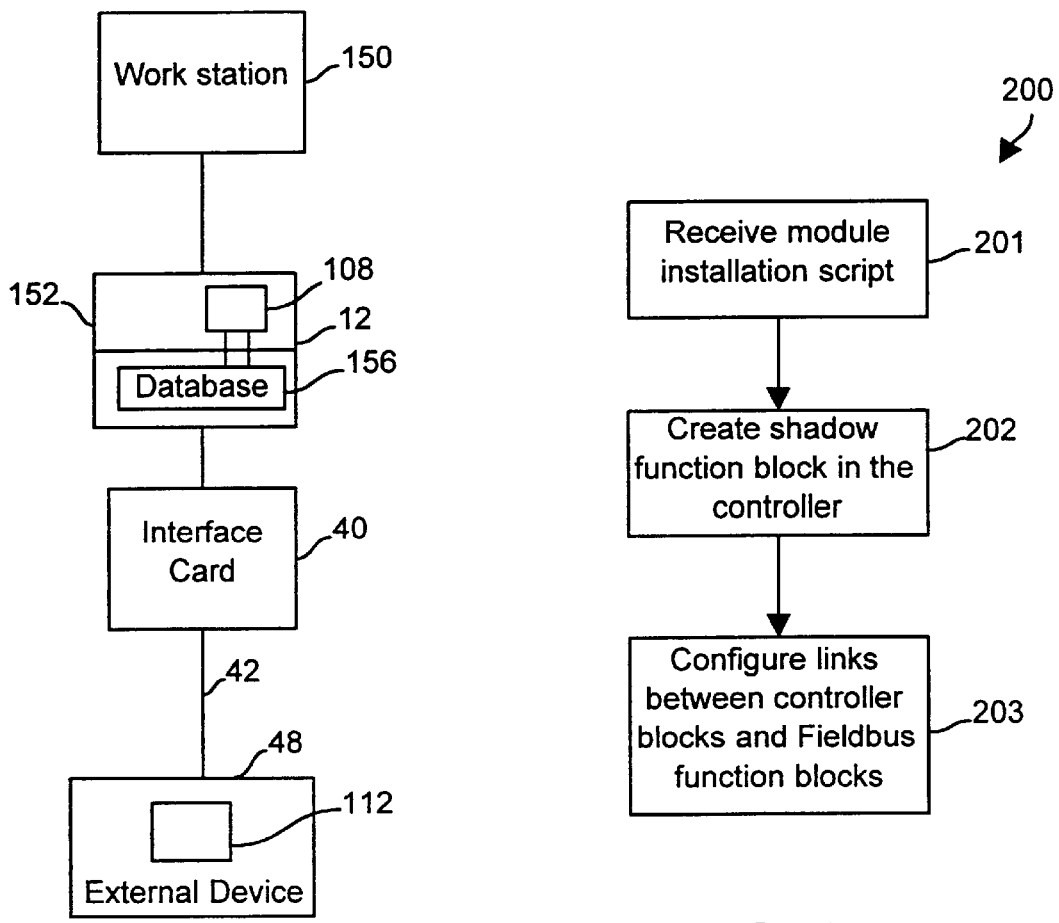
FIG. 5 is a block diagram of part of a process control system using the shadow function block of the present invention.
FIG. 6 is a flow chart illustrating the installation of a control module within the controller of FIG. 1.

The configuration, implementation and use of a shadow function block will now be described in more detail with reference to FIGS. 5–13. FIG. 5 illustrates the physical setup of a portion of the process control network of FIG. 1 in more detail. A user workstation 150, which may be any one of the PCs 14 of FIG. 1, is communicatively connected to the controller 12 which, in turn is connected through the interface card 40 to the field device 48 having the function block 112 therein. As illustrated in FIG. 5, the controller 12 has an upper portion 152 in which the control routine 100 (including the shadow function block 108) is implemented, and a lower portion which includes a database 156 for storing input and output information received from the interface card 40 as well as other I/O cards. Generally speaking, the interface card 40 is configured to automatically receive linked data published by the function block 112 via the publisher/subscriber VCR (at the published rate defined by the macrocycle of the Fieldbus bus 42) and to store this data in the lower database 156 where it is provided to the shadow function block 108 at the scan rate of the control module 100 within the controller 12. Likewise, the interface card 40 is configured to publish linked data generated by a function block within the controller 12 on the Fieldbus bus 40 using synchronous communications within the Fieldbus network. Also, the interface card 40 is configured to periodically request (using asynchronous communications) view and/or alarm data from the function block 112 and stores this information in the lower database 156 for delivery to the shadow function block 108 at the scan rate of the controller module 100.

The interface card 40 and/or the database 156 may comprise, may be part of, or may be controlled by a communication port of the shadow function block 108 which implements communications between the shadow function block 108 and the external function block 112. The communication port includes an input which receives data from the external function block 112 using the communication protocol of the external function block 112 and an output which communicates with the external function block 112 to send data (including write commands) to the external function block 112 using the communication protocol of the external function block 112. Of course, the communication port of the shadow function block 108 may be implemented in software and/or other hardware in the controller in addition to or in conjunction with the interface card 40 and the database 156.

To configure a control routine using a shadow function block, a user at the workstation 150 can use any standard tools, such as those provided with the DeltaV control system, to initially configure the process control system. In general, the DeltaV configuration tools enable the user to display, configure and interconnect blocks, such as those illustrated in FIG. 4, to implement or design one or more control loops or modules associated with the control routine. For the purpose of this discussion, the control routine for controlling a process may have any number of modules, each of which may have any number of desired blocks therein implementing any number of control loops. During the configuration or design of a process control module, the user may select the use of a function block that is located within a device external to the controller 12 (such as a function block within one of the Fieldbus devices of the process control system). In this case, the configuration tool associated with the controller 12 may be designed to ask the user to specify the physical connections of the device to the controller 12 and other device and function block configuration information necessary to initially configure the device and/or the function block within the device according to the communication protocol of the that device (e.g., the Fieldbus communication protocol). The user may be prompted to provide this information in any desired manner such as through the use of dialog boxes. Of course, the exact information needed will depend on the type of device and function block being specified, as will be understood and known by those familiar with device protocol being used, such as the Fieldbus protocol.

One way of specifying that a function block is to be implemented by a particular external device (such as a Fieldbus device) is by having the user specify that the function block located in an external device, using a browser (or other software) to list or depict the external devices connected to the controller and then selecting one of the listed external devices as the device in which the function block is to be implemented. Another way is to select the function block on the screen and then drag and drop that function block onto a depiction of a block in an external device. Either of these or any other desired action may tell the configuration tool that the function block to be implemented is within the external device and cause the configuration tool to request the user for the specific device and function block configuration information needed to configure and access the particular external function block. Both of these methods allow a user to select a function block for execution in an external device from a list of external devices.

When the user specifies that an external function block is to be used (i.e., external to the controller 12), the configuration routine then establishes a shadow function block in the controller and take steps to configure the Fieldbus device and function block within the device, as will be described below. Of course, the configuration tool will preferably allow the user to specify all of the blocks to be used, the locations of those blocks (that is, if any of the block will be located in external devices) and the links between blocks before implementing the shadow blocks and initializing the external (e.g., Fieldbus) devices. This allows the configuration of the external network to be performed once after the location of all of the blocks and the nature of all of the links between the function blocks is specified.

In conjunction with enabling the controller to view or have access to parameter data for function blocks within external devices (via the shadow function block), the interface card 40 may also provide device and segment status information to the controller for diagnostic purposes. The interface card 40 may, for example, receive a list including an identification of the devices which are supposed to be attached to a particular portion or segment of the Fieldbus network and pertinent information about each of the identified devices. The interface card 40 may then periodically obtain (via synchronous or asynchronous communications) information pertaining to the devices actually connected to the Fieldbus segment or pertaining to the segment itself and compare this information to the information within the received list. In this manner the interface card 40 can determine if field devices are missing or are not connected to the Fieldbus network, if the wrong field devices are connected to the Fieldbus network, if a field device goes out of service, etc. Likewise, the interface card 40 can determine if there are segment level problems, such as if there is no communication over the Fieldbus bus. If desired, the interface card 40 may send this device and segment status data to the controller (or other device) for diagnostic purposes.

Furthermore, the interface card 40 can monitor the communication and timing status of a Fieldbus segment for diagnostic purposes. In particular, the interface card 40 may auto-subscribe to the data published by the field devices on the Fieldbus bus, and may analyze the received data to determine, for example, timing problems or other problems on the Fieldbus bus. If desired, the interface card 40 may time stamp and store the incoming data, and then keep statistics related to each function block or device connected to the bus and/or statistics related to a segment of the bus. The interface card 40 may, for example, determine the minimum and maximum times between updates for particular published data and may determine if these times are within an allowable range to see if a communication problem exists. Likewise, the interface card 40 can compare the times at which particular data is supposed to be published on the bus with the actual time such data is published on the bus, can monitor stale data counts for function blocks or devices and can keep any other desired statistics to detect timing or other communication errors on the bus. Of course any other published data may be monitored to determine communication or timing problems on the bus. As noted above, the statistical information generated or stored by the interface card 40 may be kept for any function block, device, or segment of the bus and may be sent to or read by the controller (or any other device) for diagnostic purposes.

FIG. 6 illustrates a flow chart 200 which indicates the way in which a shadow function block within the controller 12 may be set up. While the flow charts of FIGS. 6–12 illustrate a number of blocks, it will be understood that these blocks merely indicate the a sequence of steps to be performed and that the steps may be performed in software or in any other desired manner. The flow chart blocks of FIGS. 6–12 do not, however, necessarily represent function blocks or controller blocks similar to the function blocks illustrated in FIG. 4.

At a block 201, the controller 12 receives a module installation script from the user workstation, which may be one of the PCs 14 of FIG. 1. The module installation script is created by the configuration tool run by the user workstation and includes all of the information needed to set up the objects (in an object-oriented programming language) associated with the function blocks of a control module in the controller 12. That is, the installation script configures the blocks (such as the function blocks associated with the control module 100 of FIG. 4) and the interconnections between those blocks defined by the links. Of course, all of this information is provided by the user while using the configuration tool. When a function block is to be implemented by an external function block, such as one in a field device, a block 202 creates a shadow function block within the controller 12 by creating an object (within an object oriented programming language) that is similar to the function blocks for other devices located within the controller except that it does not perform any control functions. While the shadow function blocks are preferably created as an object in an object-oriented programming environment, they may be created using any other programming environment associated with or used by the controller 12.

When setting up a shadow function block, the block 202 causes the interface card 40 to scan the actual function block within the Fieldbus device and obtain information from the actual function block that is needed to initially configure the shadow function block. Furthermore, the block 202 establishes the database locations within the lower database 156 of the controller 12 to which the interface card 40 should place view object and alert object data as well as linked parameter data obtained from the actual function block. The block 202 also informs the interface 40 how often to request view object and alert object information based on the scan rate of the module 100.

After the block 202 creates a shadow function block in the controller and identifies the appropriate interconnections between the database 156, the shadow function block 108 and the interface card 40, a block 203 configures the lower database 156 to provide the stored linked parameter data (i.e., that obtained by the interface card 40 using the synchronous subscriber/publisher VCR) to the shadow function block instead of the data obtained for the linked parameters using the view object operation. This is necessary to assure the most recent data for the linked parameters (i.e., that obtained by the synchronous communications in the Fieldbus network) is provided to the shadow function block 108 instead of the data obtained for those parameters obtained using the view list operation (which occurs asynchronously).

When a control module that uses a shadow function block is initially configured, the Fieldbus communication network must also be configured to support the necessary synchronous and asynchronous communications between the actual function block 112 and the shadow function block 108. FIGS. 7–10 illustrate flowcharts depicting the steps involved in configuring the Fieldbus network to support shadow function blocks. While FIGS. 7–10 are illustrated as separate flowcharts, they can be performed simultaneously or nearly simultaneously.

FIG. 7 depicts a flow chart 210 that may be used to establish a link active schedule in the Fieldbus network. A block 211 within the controller 12 receives the LAS schedule installation script as developed by the configuration tool for the Fieldbus communication network after accounting for all of the synchronous communications that must take place over the Fieldbus bus, including those necessary for the shadow function blocks. Of course, this installation script can be produced using known tools available for the Fieldbus communication protocol which may also be integrated into the controller 12 configuration tool. A block 212 then installs the LAS schedule to the targeted Fieldbus port, which may be, for example, the interface card 40 of FIG. 5.

Thereafter, a block 213 automatically creates subscriber links and VCRs within the fieldbus network based on the data published by the Fieldbus devices. In particular, these subscriber links are created so that the interface card 40 subscribes to the linked parameters of the Fieldbus function blocks for which shadow function blocks exist within the controller 12. Likewise, the interface card 40 publishes data that is generated by function blocks within the controller 12 and that is sent to the shadow function blocks within the controller 12 as a linked parameter. Generally speaking, the interface card 40 acts as a function block proxy for the linked data to and from the shadow function blocks. Furthermore, the interface card 40 acts as a function block proxy to request view object and alert object information from the actual function blocks for which shadow function blocks exit so as to update the non-linked data associated with the shadow function blocks within the controller 12.

A block 214 then maps the LAS installation status into the controller (or Delta-V) status so that the controller 12 may determine if the LAS installation has been accepted or rejected by the Fieldbus network. This enables the controller 12 to verify whether the installation of the Fieldbus network has occurred.

FIG. 8 depicts a flow chart 220 indicating the steps used to set up publisher links within the Fieldbus network. A block 221 in the controller 12 receives the publisher links created by the workstation configuration tool for the Fieldbus network and a block 222 then sends these publisher links to the interface card 40 to establish the publisher links and the associated VCRs required to support the shadow function block communications as well as other communications on the Fieldbus bus 42.

Figures 9, 10:
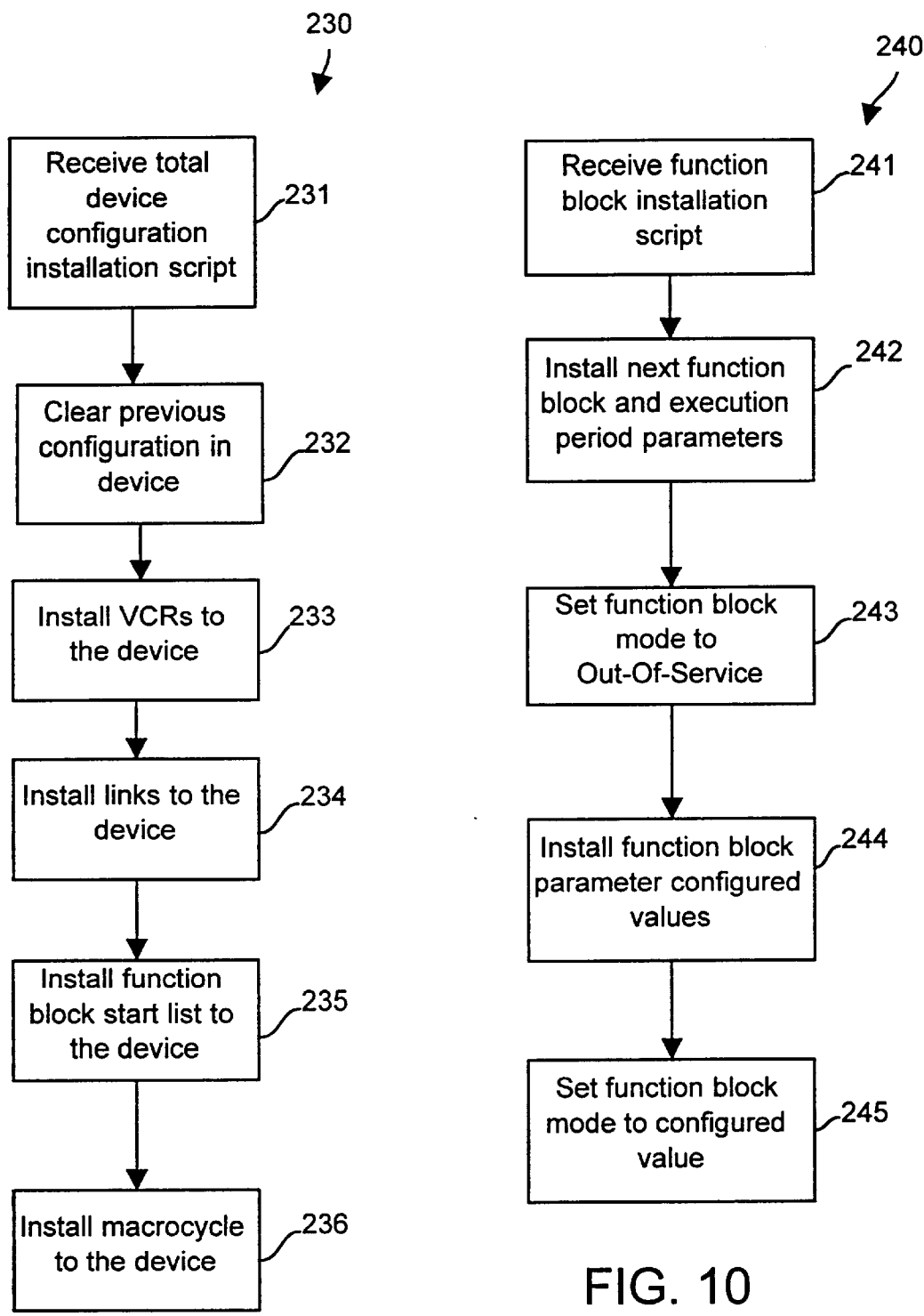
FIG. 9 is a flow chart illustrating the installation of a device configuration in a device within the Fieldbus portion of the process control network of FIG. 1.
FIG. 10 is a flow chart illustrating the installation of a function block within a device in the Fieldbus portion of the process control network of FIG. 1.

FIG. 9 depicts a flow chart 230 illustrating the steps associated with installing a device configuration within a Fieldbus device. A block 231 receives the device configuration installation script from the workstation as configured by the configuration tool after all of the links and other information for that device have been established. A block 232 then clears the previous configuration in the device by sending appropriate commands to the device via the interface card 40. While not strictly necessary, it has been found that it is desirable to clear the previous device configuration before trying to install a new device configuration in the Fieldbus device to thereby prevent installation problems.

A block 233 then installs the VCRs and a block 234 installs the links necessary to implement communication according to the link active schedule and publisher/subscriber relationships established for the Fieldbus network. A block 235 then installs the Fieldbus start list to the device, which synchronizes the function block execution of that device with the execution of other function blocks in other devices of the Fieldbus network. Thereafter, a block 236 installs the macrocycle to the device after that macrocycle has been computed or determined to account for all of the synchronous communications necessary to occur over the bus 42 associated with the Fieldbus.

FIG. 10 depicts a flow chart 240 illustrating the steps used to set up a particular function block within a particular device within the Fieldbus network. A block 241 first receives a function block installation script as developed by the configuration tool. A block 242 then installs the next function block and execution period parameters, as is typically done when configuring a Fieldbus function block. Thereafter, a block 243 sets the function block mode to out of service, which is necessary to change values within the function block. A block 244 then installs the function block parameter configured values or user overrides (i.e., the user defined values) within the function block. These user configured values may be established in any manner, such as through the use of dialog boxes in the workstation during the configuration of the process control system. Thereafter, a block 245 sets the function block mode to the configured value so that the function block will operate according to the manner in which it is configured.

It will be understood that the flow charts of FIGS. 7–10 are merely indicative of the normal steps that are used to configure a Fieldbus network. In this case, however, the set up of the Fieldbus network accounts for and includes the publisher/subscriber links and VCRs required to support the operation of any shadow function blocks within the controller 12. Of course, the user workstation or controller 12 may configure the Fieldbus network automatically based on the information provided by the user about the set up of the control system during the configuration of that system.

Figure 11:
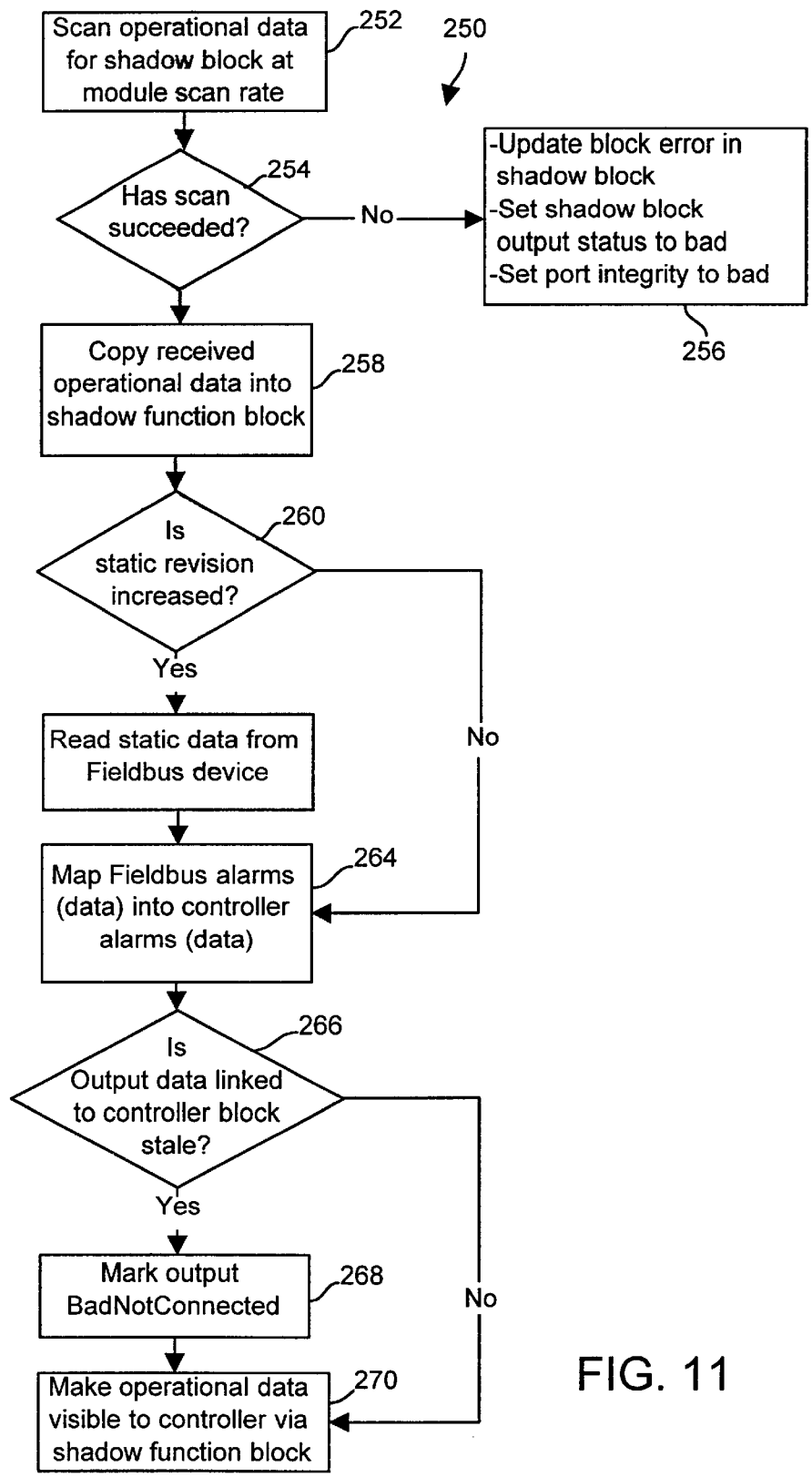
FIG. 11 is flow chart illustrating the operation of the shadow function block and related components during operation of a centralized control module using the shadow function block.

Referring now to FIG. 11, a flow chart 250 illustrates the operation of a shadow function block when a control module including that shadow function block is run on the controller 12 to perform process control. As will be understood, the controller 12 implements the blocks within a particular module (such as the blocks 102, 104, 106 and 108 of FIG. 4) at the module scan rate associated with the module. However, communication of linked data (such as that defined by the links in the diagram of FIG. 4) between actual Fieldbus function blocks and the shadow function blocks occurs at the synchronous macrocycle rate of the Fieldbus network, which may be different than the module scan rate of the controller 12. As a result, the data for the linked parameters is typically stored in the lower database 156 of the controller 12 at a different (usually faster) rate than the data for non-linked parameters.

When the shadow function block is implemented in the controller 12, a block 252 scans the operational data stored within the lower database 156 of the controller 12. That is, during each module period, the operational data that has been stored in the lower database 156 by the interface module 40 is read. A block 254 determines if the scan succeeded. If not, a block 256 updates the block error in the shadow function block, sets the shadow function block output status to bad and sets the port integrity to indicate to the controller 12 that the shadow function block has failed and that, therefore, there may be a problem with respect to the external function block or with respect to communications with the external function block within the Fieldbus network. If such an error is detected, the shadow function block data is not updated (as that data is old or bad data in any event) and the operation of updating the data within the shadow function block stops for that module scan cycle. However, if the scan succeeds, a block 258 copies the received operational data into the shadow function block. Of course, the operational data includes not only the data obtained by the view and alert objects at the module scan rate but also the data for the linked parameters which is obtained and placed into the lower database 156 at the rate determined by the macrocycle of the Fieldbus network.

A block 260 then determines whether the static revision parameter associated with the actual function block (which is provided by the view object operation) has increased. If so, a block 262 instructs the interface card 40 to read the static data associated with the Fieldbus function block and to forward that static data to the lower database 156, where this data is read and placed into the shadow function block. As is known, the static revision indicates whether any of the static data normally provided by the static view list is changed. If the static revision is not increased, none of the static data is changed and it is not necessary to read that data during each cycle of the control module. However, if the static data revision is increased, then some of the static data has changed and that static data needs to be read and placed in the shadow function block so as to make the shadow function block mirror the data that is actually within the external function block.

After the static data is obtained, or if the static revision has not increased, a block 264 maps the Fieldbus alarms (and other data if necessary) into the alarms (or other data fields) of the controller 12. This mapping may be accomplished using a lookup table or by any other mapping technique. The mapped alarms (and other data) are then stored in the shadow function block to be used by other control blocks of the control module. The alarms may also be displayed to a user or used in any other desired manner.

Thereafter, a block 266 determines whether the data for the linked parameters is stale (i.e., is out of date). Such an indication is regularly provided in Fieldbus communications and indicates that the data being received was not generated in the most recent macrocycle of the Fieldbus network, which may indicate that a timing or other problem exists within the Fieldbus network. If the link parameter data is stale, a block 268 marks the output data as BadNotConnected, which may change the mode or status of other function blocks within the controller 12. Thereafter, or if the linked data is not stale, a block 270 makes the operational data visible to other blocks within the controller 12 and the controller 12 continues to operate based on the new operational data.

Figure 12:
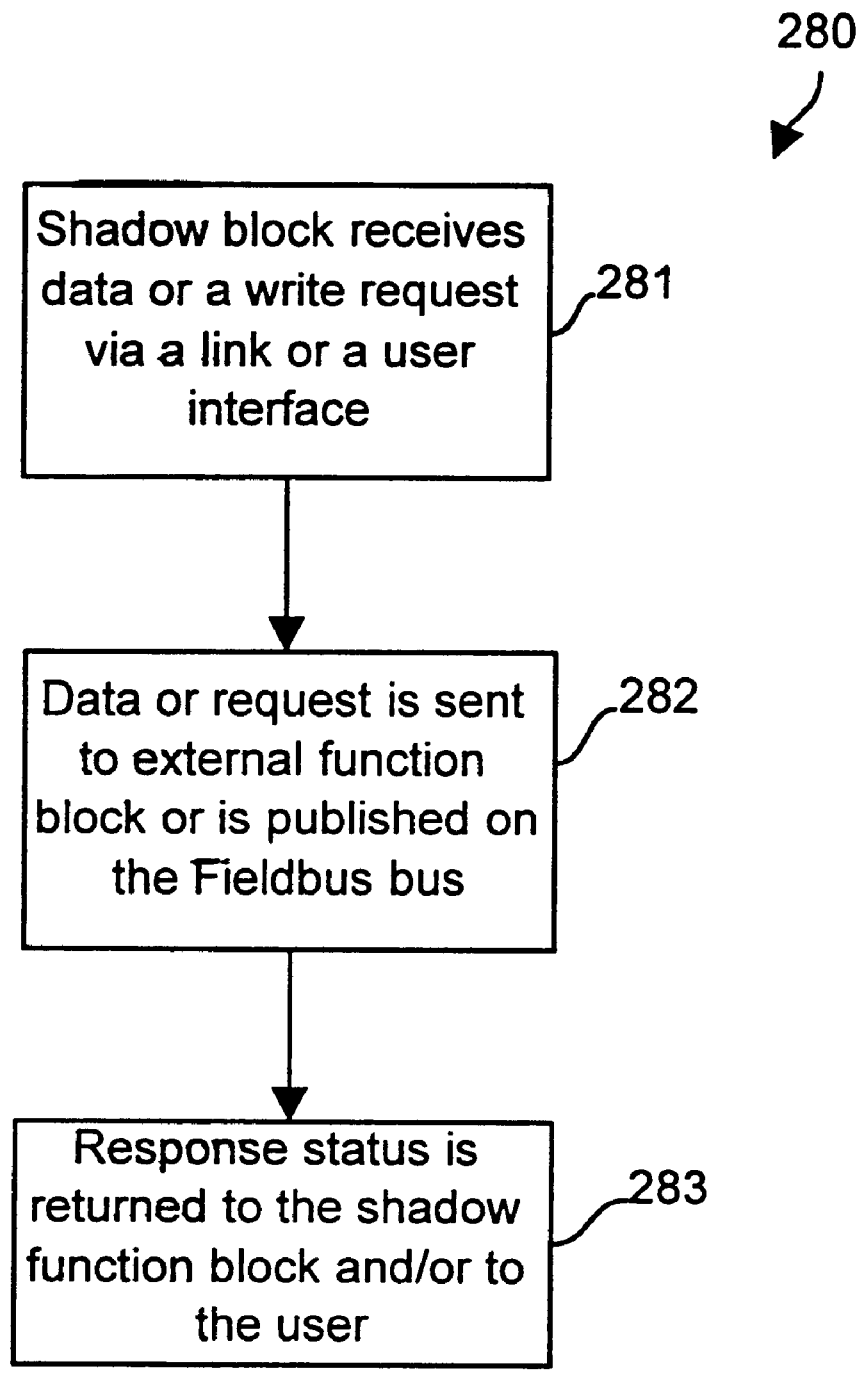
FIG. 12 is a flow chart illustrating the communication of data and write requests from a block in a centralized controller or a user to an external function block in a field device using the shadow function block of the present invention.

As will be understood, the flow chart of FIG. 11 illustrates the operation of updating the shadow function block to assure that it mirrors the data associated with the external function block within an external device. However, the shadow function block may also communicate data and send write commands to the external function block. Such data and write commands may be provided from a user at, for example, a workstation or may originate and be sent by other function blocks within the controller 12 via established links. Referring now to FIG. 12, a flow chart 280 illustrates the steps taken to send data or write commands to an external function block via the shadow function block. At a block 281, a control block within the controller 12 writes data via an input link to the shadow function block. Alternatively, a user may send a write command to the shadow function block via a user interface which may allow a user to, for example, manually change a set point or other value associated with the external function block. The shadow function block then immediately sends a write command or other data to the interface card 40. If such data or command is associated with a linked parameter, the interface card 40 publishes the data on the Fieldbus bus to the external function block at the appropriate or synchronous time as defined by the macrocycle of the Fieldbus network. If the write command or data is not associated with a linked parameter, the interface card 40 uses asynchronous communications to relay the command or data to the external function block. Thereafter, the external function block receives the data or command and updates its attribute parameters accordingly. These changes are then communicated back through the interface card 40 using publisher/subscriber communications as well as the view object operation and the new data is placed in the lower database 156 where, during the next scan cycle of the control module, that data is placed into the shadow function block.

When the block 282 sends a write request to the interface card 40 and that request is sent to the external function block, the interface card 40 receives a response from the function block indicating whether the write has been completed or whether the data has been accepted or received. The interface card 40, in turn, sends this response to the shadow function block. If the write failed, the status, alarm or error settings of the shadow function block may be changed to reflect that error. Thus, for example, if a write request associated with a linked parameter was not received or was not properly implemented by the interface 40, this may be indicated in the error status of the shadow function block. If desired, when a write command which originated with a user fails to be implemented, a block 283 may send an indication of such failure to the user at a workstation or other user interface to thereby notify the user of the failed attempt to write to the external function block.

While the description hereof has been directed to the implementation and use of a single shadow function block 108, it will be understood that multiple shadow function blocks can be implemented in the same control module or controller to enable the control module or controller to use multiple external function blocks. Furthermore, shadow function blocks can be implemented using any external process control communication protocol (besides the Fieldbus protocol) and may be used to communicate with any type of function block including any function block that is similar to or the same as any of the different function blocks specifically identified by and supported by the Fieldbus protocol. Moreover, while shadow function blocks are described herein as being associated with an external function block in the form of what the Fieldbus protocol defines as a "function block," it is noted that the use of the expression "function block" herein is not limited to what the Fieldbus protocol identifies as a function block but, instead, includes any other type of block, program, hardware, firmware, etc., associated with any type of control system and/or communication protocol and that can be used to implement some control function. Thus, while function blocks typically take the form of objects within an object oriented programming environment, this need not be case and can, instead, be other logical units used to perform particular control (including input and output) functions within a process control environment.

Moreover, although the shadow function block described herein is preferably implemented in software stored in, for example, a controller or other process control device, it may alternatively or additionally be implemented in hardware, firmware, etc., as desired. If implemented in software, the shadow function block of the present invention may be stored in any computer readable memory such as on a magnetic disk, a laser disk, or other storage medium, in a RAM or ROM of a computer, etc. Likewise, this software may be delivered to a user or a device via any known or desired delivery method including, for example, over a communication channel such as a telephone line, the internet, etc.

Also, while the shadow function block of the present invention is described in detail in conjunction with a process control network that implements process control functions in a decentralized or distributed manner using a set of Fieldbus devices, it should be noted that the shadow function block of the present invention can be used with process control networks that perform control functions using other types of field devices and communication protocols, including protocols that rely on other than two-wire buses and protocols that support analog and/or digital communications. For example, the shadow function block of the present invention can be used in any process control network that uses devices conforming to the HART, PROFIBUS, etc. communication protocols or any other communication protocol that now exists or that may be developed in the future. Likewise, if desired, the shadow function block of the present invention can be used in process control networks that do not have distributed control functions but, instead, that use a centralized controller or control scheme to control the devices therein.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process routine implemented by a processor, wherein the processor is communicatively coupled to an external device via a communications network, the process routine comprising:

a plurality of communicatively interconnected internal function blocks located within the processor and operating according to a first protocol, the plurality of internal function blocks implemented in a scheduled manner;

a shadow function block residing within the processor and communicatively interconnected with at least one of the plurality internal function blocks according to the first protocol; and an external function block residing within the external device and communicatively coupled to the shadow function block, wherein the shadow function block operates during its scheduled operating time to mirror data between the external function block and the at least one of the plurality of internal function blocks.

2. The process routine of claim 1, wherein the shadow function block further includes an output that passes data pertaining to the external function block to the at least one of the plurality of internal function blocks according to the first protocol.

3. The process routine of claim 2, wherein the shadow function block further includes an input that receives data pertaining to the external function block independently of the scheduled operation of the at least one of the plurality of internal function blocks.

4. The process routine of claim 3, wherein the external function block communicates via the communication network using a second protocol that is different than the first protocol and wherein the input communicates with the external function block using the second communication protocol.

5. The process routine of claim 4, wherein the second protocol is a Fieldbus communication protocol and wherein the input communicates with the external function block using the Fieldbus communication protocol.

6. The process routine of claim 5, wherein the input uses an interface device configured to communicate with the external device using the Fieldbus communication protocol to communicate with the external function block.

7. The process routine of claim 1, wherein the shadow function block further includes an input that communicates with the external function block using synchronous communications.

8. The process routine of claim 1, wherein the shadow function block further includes an input that communicates with the external function block using synchronous and asynchronous communications.

9. The process routine of claim 1, wherein the external device communicates using a device communication protocol that supports the communication of logically linked packets of data using standardized communication calls, and wherein the shadow function block communicates with the external function block using the standardized communication calls associated with the device communication protocol.

10. The process routine of claim 9, wherein the device communication protocol is a Fieldbus communication protocol, and wherein the shadow function block communicates with the external device using view objects within the Fieldbus communication protocol.

11. The process routine of claim 1, wherein the shadow function block receives an alarm indication from the external function block and wherein a memory stores the received alarm indication.

12. The process routine of claim 1, wherein the shadow function block further includes an input that communicates with the external function block and further includes an output that sends data to the external function block using a second protocol associated with the external function block.

13. A controller adapted to be communicatively coupled to a plurality of field devices wherein one of the field devices includes an external function block that communicates using a device communication protocol, the controller comprising:

a processor;

a memory; and a control routine including a plurality of function blocks stored in the memory and implemented by the processor in a scheduled manner to control the plurality of field devices, the plurality of function blocks including;

a multiplicity of interconnected internal function blocks configured using a controller protocol; and a shadow function block that communicates with at least one of the multiplicity of interconnected internal function blocks using the controller protocol and that communicates with the external function block within the one of the field devices using the device communication protocol, wherein the shadow function block mirrors data pertaining to the external function block received from the external function block to one of the multiplicity of interconnected internal function blocks, thereby allowing the external function block to operate as if implemented by the processor.

14. The controller of claim 13, wherein the shadow function block mirrors the data pertaining to the external function block independently of the operation of the multiplicity of internal function blocks.

15. The controller of claim 13, wherein the device communication protocol is a Fieldbus communication protocol and wherein the interface function block communicates with the external function block using the Fieldbus communication protocol.

16. The controller of claim 15, wherein the interface function block communicates with the external function block using view objects within the Fieldbus communication protocol.

17. The controller of claim 15, wherein the interface function block communicates with the external function block using subscriber/publisher communications within the Fieldbus communication protocol.

18. The controller of claim 13, wherein the shadow function block mirrors data pertaining to inputs and outputs of the external function block.

19. The controller of claim 13, wherein the shadow function block mirrors data pertaining to alarms generated by the external function block.

20. The controller of claim 13, wherein the shadow function block mirrors data pertaining to the mode of the external function block.

21. The controller of claim 13, wherein the shadow function block mirrors data generated by the another one of the multiplicity of internal function blocks to the external function block.

22. The controller of claim 13, wherein the shadow function block mirrors a control command to the external function block.

23. A method of implementing a control routine within a process controller communicatively coupled to a field device, wherein the field device has an external function block located therein and communicates using a device communication protocol, the method comprising the steps of:

storing a plurality of interconnected internal function blocks in the controller configured according to a controller protocol for implementation in a scheduled manner as part of the control routine;

creating a shadow function block within the controller configured according to the controller protocol, wherein the shadow function block is configured to mirror data between the external function block and the plurality of interconnected internal function blocks;

creating a control routine that uses the plurality of interconnected internal function blocks and data mirrored through the shadow function block from the external function block to control the process as if the external function block was within the controller; and storing data associated with the external function block in the interface function block during implementation of the control routine.

24. The method of claim 23, further including the step of using the shadow function block to communicate with the external function block to update the data associated with the external function block independently of the operation of the plurality of interconnected internal function blocks.

25. The method of claim 23, further including the step of using the interface function block to communicate further data to the external function block to alter the configuration of the external function block.

26. The method of claim 23, further including the steps of allowing a user to configure the control routine by specifying each of a number of function blocks to be used in the control routine, identifying the interconnections between the specified function blocks to be used in the control routine and specifying the location of a particular specified function block as being an internal function block implemented in the controller or the external function block implemented by the field device.

27. The method of claim 26, wherein the step of specifying the location of the particular specified function block as being the external function block includes the step of selecting an external device in which the external function block is to be implemented from a list of external devices connected to the controller.

28. The method of claim 23, wherein the step of storing the data associated with the external function block includes the step of storing an alarm indication generated by the external function block in the interface function block and wherein the method further includes the step of using the alarm indication stored in the interface function block to trigger alarm processing within the controller.

29. The method of claim 23, further including the step of displaying the control routine by displaying a depiction of one or more of the plurality of internal function blocks, a depiction of the shadow function block and depictions of the interconnections between the one or more of the plurality of internal function blocks and the shadow function block so that the interface function block represents the external function block.

30. The process routine of claim 1, wherein the shadow function block is configured to automatically communicate with the external function block in a periodic manner.

31. The controller of claim 13, wherein the interface function block automatically communicates with the external function block in a periodic manner.

32. The method of claim 23, wherein the step of creating an interface function block includes the step of creating the interface function block to automatically communicate with the external function block in a periodic manner.

33. A process routine implemented by a processor, the process routine comprising:

a plurality of interconnected internal function blocks operating within the processor and, communicating according to a first protocol, the plurality of internal function blocks implemented in a scheduled manner;

a shadow function block operating within the processor and communicating with at least one of the plurality of internal function blocks according to the first protocol; and an external device communicating with the processor via a communications network using a second protocol, the external device further including:

an external function block operating within the external device and communicatively coupled to the shadow function block using the second protocol;

a data transfer between the shadow function block and the external function block, the data transfer operating to mirror at least one input or at least output of the shadow function block to a corresponding input or output of the external function block, or vice versa.

* * * * *

UNITED STATES PATENT AND TRADEMARK OFFICE
CERTIFICATE OF CORRECTION

PATENT NO. : 6,738,388 B1
DATED : May 18, 2004
INVENTOR(S) : Dennis L. Stevenson et al.

It is certified that error appears in the above-identified patent and that said Letters Patent is hereby corrected as shown below:

Title page,
Item [56], References Cited, U.S. PATENT DOCUMENTS, delete "5,962,557" and insert -- 5,932,557 --.

Column 1,
Line 52, delete "network" and insert -- network. --.

Column 21,
Lines 18-19, delete "to be implement" and insert -- to implement --.

Column 31,
Lines 7, 10, 14 and 64, delete "interface" and insert -- shadow --.

Column 32,
Lines 20, 22 and 35, delete "interface" and insert -- shadow --.
Lines 39-40, delete "and interface function block includes the step of creating the interface" and insert -- a shadow function block includes the step of creating the shadow --.
Line 46, delete "and," and insert -- and --.

Signed and Sealed this

Twelfth Day of October, 2004

JON W. DUDAS
*Director of the United States Patent and Trademark Office*